US008832852B2

(12) United States Patent
Raley et al.

(10) Patent No.: US 8,832,852 B2
(45) Date of Patent: Sep. 9, 2014

(54) METHOD AND APPARATUS FOR DYNAMIC PROTECTION OF STATIC AND DYNAMIC CONTENT

(75) Inventors: Michael Raley, Downey, CA (US);
Daniel Chen, Torrance, CA (US);
Hsi-Cheng Wu, Alhambra, CA (US);
Thanh Ta, Huntington Beach, CA (US)

(73) Assignee: ContentGuard Holdings, Inc., Plano, TX (US)

( * ) Notice: Subject to any disclaimer, the term of this patent is extended or adjusted under 35 U.S.C. 154(b) by 1482 days.

(21) Appl. No.: 10/425,941

(22) Filed: Apr. 30, 2003

(65) Prior Publication Data

US 2003/0204753 A1 Oct. 30, 2003

Related U.S. Application Data

(63) Continuation of application No. 10/046,670, filed on Jan. 16, 2002, now Pat. No. 7,743,259, which is a continuation-in-part of application No. 09/649,841, filed on Aug. 28, 2000, now Pat. No. 7,073,199.

(60) Provisional application No. 60/261,803, filed on Jan. 17, 2001.

(51) Int. Cl.
*H04L 29/06* (2006.01)
*G06F 21/00* (2013.01)

(52) U.S. Cl.
USPC ............ 726/28; 726/27; 380/258; 705/51

(58) Field of Classification Search
None
See application file for complete search history.

(56) References Cited

U.S. PATENT DOCUMENTS

| 3,263,158 A | 7/1966 | Bargen et al. |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,200,700 A | 4/1980 | Mäder |

(Continued)

FOREIGN PATENT DOCUMENTS

| BR | 9810967 A | 10/2001 |
| EP | 0 067 556 B1 | 12/1982 |

(Continued)

OTHER PUBLICATIONS

Perrit, Jr., H., "Permission Headers and Contract Law", pp. 27-48, Jan. 1994, IMA Intellectual Property Project Proceedings, vol. 1, Issue 1.

(Continued)

*Primary Examiner* — Gilberto Barron, Jr.
*Assistant Examiner* — Abdulhakim Nobahar
(74) *Attorney, Agent, or Firm* — Marc S. Kaufman; Stephen M. Hertzler; Reed Smith LLP

(57) ABSTRACT

A method and apparatus for dynamically protecting content in a system for managing use of the content in accordance with usage rights. A request is received from a user device for content stored on a server. Information is gathered from at least one source to build the content in accordance with the request and the content is mapped to usage rights. A reply including the usage rights is sent to the user device, and use of the content is permitted based on the usage rights under control of a security module for enforcing usage rights.

36 Claims, 19 Drawing Sheets

(56) References Cited

U.S. PATENT DOCUMENTS

| | | |
|---|---|---|
| 4,220,991 A | 9/1980 | Hamano et al. |
| 4,278,837 A | 7/1981 | Best |
| 4,323,921 A | 4/1982 | Guillou |
| 4,361,851 A | 11/1982 | Asip et al. |
| 4,423,287 A | 12/1983 | Zeidler |
| 4,429,385 A | 1/1984 | Cichelli et al. |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,621,321 A | 11/1986 | Boebert et al. |
| 4,644,493 A | 2/1987 | Chandra et al. |
| 4,652,990 A | 3/1987 | Pailen et al. |
| 4,658,093 A | 4/1987 | Hellman |
| 4,713,753 A | 12/1987 | Beobert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,817,140 A | 3/1989 | Chandra et al. |
| 4,827,508 A | 5/1989 | Shear |
| 4,868,376 A | 9/1989 | Lessin et al. |
| 4,888,638 A | 12/1989 | Bohn |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,162 A | 10/1991 | Santon et al. |
| 5,058,164 A | 10/1991 | Elmer et al. |
| 5,103,476 A | 4/1992 | Waite et al. |
| 5,113,519 A | 5/1992 | Johnson et al. |
| 5,129,083 A | 7/1992 | Cutler et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,174,641 A | 12/1992 | Lim |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,287,408 A | 2/1994 | Samson |
| 5,291,596 A | 3/1994 | Mita |
| 5,293,422 A | 3/1994 | Loiacono |
| 5,301,231 A | 4/1994 | Abraham et al. |
| 5,311,591 A | 5/1994 | Fischer |
| 5,319,705 A | 6/1994 | Halter et al. |
| 5,335,275 A | 8/1994 | Millar et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,386,369 A | 1/1995 | Christiano |
| 5,390,297 A | 2/1995 | Barber et al. |
| 5,394,469 A | 2/1995 | Nagel et al. |
| 5,410,598 A | 4/1995 | Shear |
| 5,412,717 A | 5/1995 | Fischer |
| 5,414,852 A | 5/1995 | Kramer et al. |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,816 A | 4/1996 | Hamilton et al. |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,535,276 A | 7/1996 | Ganesan |
| 5,539,735 A | 7/1996 | Moskowitz |
| 5,553,143 A | 9/1996 | Ross et al. |
| 5,557,678 A | 9/1996 | Ganesan |
| 5,563,946 A | 10/1996 | Cooper et al. |
| 5,564,038 A | 10/1996 | Grantz et al. |
| 5,568,552 A | 10/1996 | Davis |
| 5,619,570 A | 4/1997 | Tsutsui |
| 5,621,797 A | 4/1997 | Rosen |
| 5,625,690 A | 4/1997 | Michel et al. |
| 5,629,980 A | 5/1997 | Stefik et al. |
| 5,633,932 A | 5/1997 | Davis et al. |
| 5,634,012 A | 5/1997 | Stefik et al. |
| 5,636,346 A | 6/1997 | Saxe |
| 5,638,443 A | 6/1997 | Stefik et al. |
| 5,638,513 A | 6/1997 | Ananda |
| 5,649,013 A | 7/1997 | Stuckey et al. |
| 5,655,077 A | 8/1997 | Jones et al. |
| 5,708,709 A | 1/1998 | Rose |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,879 A | 4/1998 | Wyman |
| 5,748,783 A | 5/1998 | Rhoads |
| 5,757,907 A | 5/1998 | Cooper et al. |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,771,378 A * | 6/1998 | Holt et al. .......... 707/5 |
| 5,787,172 A | 7/1998 | Arnold |
| 5,790,677 A | 8/1998 | Fox et al. |
| 5,812,664 A | 9/1998 | Bernobich et al. |
| 5,825,876 A | 10/1998 | Peterson |
| 5,825,879 A | 10/1998 | Davis |
| 5,825,892 A | 10/1998 | Braudaway et al. |
| 5,838,792 A | 11/1998 | Ganesan |
| 5,845,281 A * | 12/1998 | Benson et al. .......... 707/9 |
| 5,848,154 A | 12/1998 | Nishio et al. |
| 5,848,378 A | 12/1998 | Shelton et al. |
| 5,850,443 A | 12/1998 | Van Oorschot et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,933,498 A | 8/1999 | Schneck et al. |
| 5,940,504 A | 8/1999 | Griswold |
| 5,943,422 A | 8/1999 | Van Wie et al. |

(56) References Cited

U.S. PATENT DOCUMENTS

| | | | |
|---|---|---|---|
| 5,949,876 A | 9/1999 | Ginter et al. | |
| 5,982,891 A | 11/1999 | Ginter et al. | |
| 5,987,134 A | 11/1999 | Shin et al. | |
| 5,999,624 A | 12/1999 | Hopkins | |
| 5,999,949 A | 12/1999 | Crandall | |
| 6,006,332 A | 12/1999 | Rabne et al. | |
| 6,020,882 A | 2/2000 | Kinghorn et al. | |
| 6,047,067 A | 4/2000 | Rosen | |
| 6,073,234 A | 6/2000 | Kigo et al. | |
| 6,091,777 A | 7/2000 | Guetz et al. | |
| 6,112,181 A | 8/2000 | Shear et al. | |
| 6,112,239 A | 8/2000 | Kenner et al. | |
| 6,115,471 A | 9/2000 | Oki et al. | |
| 6,135,646 A | 10/2000 | Kahn et al. | |
| 6,138,107 A | 10/2000 | Elgamal | |
| 6,138,119 A | 10/2000 | Hall et al. | |
| 6,141,754 A | 10/2000 | Choy | |
| 6,151,601 A * | 11/2000 | Papierniak et al. | 707/10 |
| 6,157,719 A | 12/2000 | Wasilewski et al. | |
| 6,157,721 A | 12/2000 | Shear et al. | |
| 6,169,976 B1 | 1/2001 | Colosso | |
| 6,173,274 B1 * | 1/2001 | Ryan, Jr. | 705/408 |
| 6,185,683 B1 | 2/2001 | Ginter et al. | |
| 6,189,037 B1 | 2/2001 | Adams et al. | |
| 6,189,146 B1 | 2/2001 | Misra et al. | |
| 6,209,092 B1 | 3/2001 | Linnartz | |
| 6,216,112 B1 | 4/2001 | Fuller et al. | |
| 6,219,652 B1 | 4/2001 | Carter et al. | |
| 6,226,618 B1 | 5/2001 | Downs et al. | |
| 6,233,684 B1 | 5/2001 | Stefik et al. | |
| 6,236,971 B1 | 5/2001 | Stefik et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,266,618 B1 | 7/2001 | Ye et al. | |
| 6,292,569 B1 | 9/2001 | Shear et al. | |
| 6,301,660 B1 | 10/2001 | Benson | |
| 6,307,939 B1 | 10/2001 | Vigarie | |
| 6,314,409 B2 | 11/2001 | Schneck et al. | |
| 6,327,652 B1 | 12/2001 | England et al. | |
| 6,330,670 B1 | 12/2001 | England et al. | |
| 6,336,189 B1 | 1/2002 | Takeda et al. | |
| 6,345,256 B1 | 2/2002 | Milsted et al. | |
| 6,353,888 B1 | 3/2002 | Kakehi et al. | |
| 6,363,488 B1 | 3/2002 | Ginter et al. | |
| 6,389,402 B1 | 5/2002 | Ginter et al. | |
| 6,389,538 B1 * | 5/2002 | Gruse et al. | 713/194 |
| 6,397,333 B1 | 5/2002 | Söhne et al. | |
| 6,401,211 B1 | 6/2002 | Brezak, Jr. et al. | |
| 6,405,369 B1 | 6/2002 | Tsuria | |
| 6,421,571 B1 * | 7/2002 | Spriggs et al. | 700/17 |
| 6,424,717 B1 | 7/2002 | Pinder et al. | |
| 6,424,947 B1 | 7/2002 | Tsuria et al. | |
| 6,424,979 B1 * | 7/2002 | Livingston et al. | 715/511 |
| 6,426,705 B1 | 7/2002 | Wischoeffer | |
| 6,487,659 B1 | 11/2002 | Kigo et al. | |
| 6,516,052 B2 | 2/2003 | Voudouris | |
| 6,516,413 B1 | 2/2003 | Aratani et al. | |
| 6,519,700 B1 * | 2/2003 | Ta et al. | 713/193 |
| 6,523,745 B1 | 2/2003 | Tamori | |
| 6,662,060 B1 | 12/2003 | Maliszewski et al. | |
| 6,697,948 B1 * | 2/2004 | Rabin et al. | 726/30 |
| 6,757,898 B1 * | 6/2004 | Ilsen et al. | 709/203 |
| 6,796,555 B1 | 9/2004 | Blahut | |
| 6,816,596 B1 | 11/2004 | Peinado et al. | |
| 6,885,748 B1 * | 4/2005 | Wang | 380/201 |
| 7,073,073 B1 | 7/2006 | Nonaka et al. | |
| 7,099,479 B1 | 8/2006 | Ishibashi et al. | |
| 2001/0009026 A1 | 7/2001 | Terao et al. | |
| 2001/0011276 A1 | 8/2001 | Durst Jr. et al. | |
| 2001/0014206 A1 | 8/2001 | Artigalas et al. | |
| 2001/0032312 A1 | 10/2001 | Runje et al. | |
| 2001/0037467 A1 | 11/2001 | O'Toole, Jr. et al. | |
| 2001/0039659 A1 | 11/2001 | Simmons et al. | |
| 2002/0001387 A1 | 1/2002 | Dillon | |
| 2002/0035618 A1 | 3/2002 | Mendez et al. | |
| 2002/0044658 A1 | 4/2002 | Wasilewski et al. | |
| 2002/0049910 A1 | 4/2002 | Salomon et al. | |
| 2002/0056118 A1 | 5/2002 | Hunter et al. | |
| 2002/0069282 A1 | 6/2002 | Reisman | |
| 2002/0082997 A1 | 6/2002 | Kobata et al. | |
| 2002/0099948 A1 | 7/2002 | Kocher et al. | |
| 2002/0120741 A1 | 8/2002 | Webb et al. | |
| 2002/0127423 A1 | 9/2002 | Kayanakis | |
| 2003/0097567 A1 | 5/2003 | Terao et al. | |
| 2003/0105718 A1 | 6/2003 | Hurtado et al. | |
| 2004/0052370 A1 | 3/2004 | Katznelson | |
| 2004/0172552 A1 | 9/2004 | Boyles et al. | |
| 2005/0177742 A1 | 8/2005 | Benson et al. | |

FOREIGN PATENT DOCUMENTS

| | | |
|---|---|---|
| EP | 0 257 585 A2 | 3/1988 |
| EP | 0 262 025 A2 | 3/1988 |
| EP | 0 332 304 A2 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 678 836 A1 | 10/1995 |
| EP | 0 679 977 A1 | 11/1995 |
| EP | 0 715 241 | 6/1996 |
| EP | 0 715 243 A1 | 6/1996 |
| EP | 0 715 244 A1 | 6/1996 |
| EP | 0 715 245 A1 | 6/1996 |
| EP | 0 715 247 A1 | 6/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 911 728 A1 | 4/1999 |
| EP | 0 934 765 A1 | 8/1999 |
| EP | 0 946 022 A2 | 9/1999 |
| EP | 0 964 572 A1 | 12/1999 |
| EP | 1 103 922 | 5/2001 |
| GB | 1483282 | 8/1977 |
| GB | 2022969 A | 12/1979 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 3-063717 A | 3/1991 |
| JP | H4-180451 | 6/1992 |
| JP | 04-369068 | 12/1992 |
| JP | 5100939 | 4/1993 |
| JP | 5168039 A2 | 7/1993 |
| JP | 05-268415 | 10/1993 |
| JP | 6-131371 A | 5/1994 |
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |
| JP | 09-153015 | 6/1997 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 A1 | 11/1992 |
| WO | WO 93/01550 A1 | 1/1993 |
| WO | WO 93/11480 A1 | 6/1993 |
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |

(56) References Cited

FOREIGN PATENT DOCUMENTS

| WO | WO 96/24092 A2 | 8/1996 |
|---|---|---|
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/42098 | 9/1998 |
| WO | WO 98/43426 A1 | 10/1998 |
| WO | WO 98/45768 A1 | 10/1998 |
| WO | WO 98/45793 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/35832 | 7/1999 |
| WO | WO 99/45491 | 9/1999 |
| WO | WO 99/48296 A1 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/08909 A | 2/2000 |
| WO | WO 00/34856 | 6/2000 |
| WO | WO 00/42492 A | 7/2000 |
| WO | WO 00/46994 A1 | 8/2000 |
| WO | WO 00/58811 A | 10/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | 01/03014 A1 | 1/2001 |
| WO | WO 01/03044 A1 | 1/2001 |
| WO | WO 01/37209 A1 | 5/2001 |
| WO | WO 2004/034223 A2 | 4/2004 |
| WO | WO 2004/103843 | 12/2004 |

OTHER PUBLICATIONS

Marvin Sirbu, et al.; "NetBill: An Internet Commerce System Optimized for Network-Delivered Services"; IEEE Personal Communications; IEEE Communications Society; US; vol. 2; No. 4; Aug. 1995; pp. 34-39.

Supplementary European Search Report; dated Feb. 8, 2005. (European Application No. 02 70 7466).

Partial European Search Report dated Sep. 20, 2004 (European Patent Application No. 03 01 2068).

Cheong S. Ang, et al; "Integrated Control of Distributed Volume Visualization Through the World-Wide-Web"; Visualization '94 Proceedings; 1994 IEEE; University of California, San Francisco; pp. 13-20.

B.J. Van Rijnsoever, et at.; "Interoperable Content Protection for Digital TV"; Multimedia and Expo 2000, ICME 2000; 2000 IEEE; Philips Research; Prof. Holstlaan 4, Eindhoven, The Netherlands; pp. 1407-1410.

European Search Report dated Aug. 9, 2004 (European Patent Application No. 03 01 2069).

Freeman-Benson, Bjorn N., "*Using the Web to Provide Information or Password Protection Without Modifying Clients*", School of Computer Science Carleton University.

Henry H. Perritt, Jr., "Technological Strategies for Protecting Intellectual Property in the Networked Multimedia Environment", Apr. 2-3, 1993, Knowbots, Permissions Headers & Contract Law.

Blaze et al, "Divertible Protocols and Atomic Proxy Cryptography" 1998 Advances in Cryptography—Euro Crypt International Conference on the Theory and Application of Crypto Techniques, Springer Verlag, DE.

Blaze et al, "Atomic Proxy Cryptography" DRAFT (Online) (Nov. 2, 1997) XP002239619 Retrieved from the Internet.

No Author, "Capability- and Object-Based Systems Concepts," Capability-Based Computer Systems, pp. 1-19 (no date).

Cox, "Superdistribution" Wired Magazine (Sep. 1994) XP002233405 URL:http://www.wired.com/wired/archive/2.09/superdis_pr.html>.

Dunlop et al, Telecommunications Engineering, pp. 346-352 (1984).

Elgamal, "A Public Key Cryptosystem and a Signature Scheme Based on Discrete Logarithms," IEEE Transactions on Information Theory IT-31(4):469-472 (Jul. 1985).

Gheorghiu et al., "Authorization for Metacomputing Applications" (no date).

Iannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.

Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.

Microsoft Word, Users Guide, Version 6.0, pp. 487-89, 549-55, 560-64, 572-75, 599-613, 616-31 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.

Samuelson et al, "Intellectual Property Rights for Digital Library and Hypertext Publishing Systems: An Analysis of Xanadu," Hypertext '91 Proceedings, pp. 39-50 (Dec. 1991).

No Author, "Softlock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 469-72, 593-94 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

AH Digital Audio and Video Series, "DTV Receivers and Measurements," Understanding Digital Terrestrial Broadcasting, pp. 159-64 (no date).

O'Driscoll, The Essential Guide to Digital Set-Top Boxes and Interactive TV, pp. 624 (no date).

Ius Mentis, "The ElGamal Public Key System," pp. 1-2 (Oct. 1, 2005) online at http://www.iusmentis.com/technology/encyrption/elgamal/.

Schneier, "Crypto Bibliography," Index of Crypto Papers Available Online, pp. 1-2 (online) (no date).

No Author, No Title, pp. 344-55 (no date).

No Author, "Part Four Networks," No Title, pp. 639-714 (no date).

(56) References Cited

OTHER PUBLICATIONS

Microsoft Word User's Guide, pp. 773-774, 315-316, 487-489, 561-564, 744, 624-633 (1993).

No Author, "What is the ElGamal Cryptosystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http://en.wikipedia.org/wiki/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (DRAFT), An Open Architecture for a Digital Library System and a Plan for its Development," Corporation for National Research Initiatives (Mar. 1988)), pp. 1-25 (May 30, 2007).

Johnson et al., "A Secure Distributed Capability Based System," Proceedings of the 1985 ACM Annual Conference on The Range of Computing: Mid-80'S Perspective: Mid-80's Perspective *Association for Computing Machinery* pp. 392-402 (1985).

Delaigle, "Digital Watermarking," Spie Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2-3, 1993).

Perritt, "Technologies Strategies for Protecting Intellectual Property in the Networked Multimedia Environment," Knowbots, Permissions Headers and Contract Law (Apr. 2-3 1993).

Tomita et al., "Digital Contents Sales System for Internet shopping Mall", Systems Development Laboratory Hitachi, Ltd. pp. 87-93 (1999).

Lampson et al., Authentication in Distributed Systems: Theory and Practice, ACM, 1992, pp. 1-47.

Extended European Search Report, European Patent Office, Application No./ Patent No. 13001227.1/2607981, May 29, 2013.

PDF Reference (Second Edition), Adobe Portable Document Format, Version 1.3, Adobe Systems Incorporated, 1985-2000, Addison-Wesley.

Adobe Acrobat 2.0, Information Products Group, Adobe Systems Incorporated, 1994.

\* cited by examiner

METHOD AND APPARATUS FOR DYNAMIC PROTECTION OF STATIC AND DYNAMIC CONTENT

RELATED APPLICATION DATA

This application is a continuation-in-part of application Ser. No. 09/649,841 filed Aug. 28, 2000, the disclosure of which is incorporated herein by reference. This application claims benefit of provisional application Ser. No. 60/261,803 filed on Jan. 17, 2001, the disclosure of which is also incorporated herein by reference.

FIELD OF THE INVENTION

The invention relates to distribution of digital content, and more particularly, to a method and apparatus for facilitating distribution of protected documents displayed with the rendering engine of a standard application program, such as an Internet Web Browser.

BACKGROUND OF THE INVENTION

The Internet is a worldwide network of computers linked together by various hardware communication links all running a standard suite of protocols known as TCP/IP (transmission control protocol/Internet protocol). The growth of the Internet over the last several years has been explosive, fueled in the most part by the widespread use of software tools (known as "browsers") which allow both HTML (hypertext markup language) viewing and HTTP (hypertext transfer protocol) navigation. Browsers allow a simple GUI (graphical user interface) to be used to communicate over the Internet. Browsers generally reside on the computer used to access content on the Internet, i.e. the client computer. HTTP is a component on top of TCP/IP and provides users access to documents of various formats using the standard page description language known as HTML and more recently XML (extensible markup language) and XHTML (extensible hypertext markup language), a reformulation of HTML into XML. The collection of servers on the Internet using HTML/HTTP has become known as the "World Wide Web" or simply the "Web."

Through HTML, XHTML, and interactive programming protocols, the author of content is able to make the content available to others by placing the content, in the form of a Web page, on an Internet Web server. The network path to the server is identified by a URL (Uniform Resource Locator) and, generally, any client running a Web browser can access the Web server by using the URL. A client computer running a browser can request a display of a Web page stored on a Web server by issuing a URL request through the Internet to the Web in a known manner.

Since the Web utilizes standard protocols and a standard rendering engine, i.e. the rendering engine of the browser, the Web has become ubiquitous. One of the primary applications of the Web has been distribution of content in the form of documents. A "document", as the term is used herein, is any unit of information subject to distribution or transfer, including but not limited to correspondence, books, magazines, journals, newspapers, other papers, software, photographs and other images, audio and video clips, and other multimedia presentations. A document may be embodied in printed form on paper, as digital data on a storage medium, or in any other known manner on a variety of media.

However, one of the most important issues impeding the widespread distribution of digital documents, i.e. documents in forms readable by computers, via electronic means, and the Internet in particular, is the current lack of protection of the intellectual property rights of content owners during the distribution and use of those digital documents. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital rights management (DRM)" herein.

In the world of printed documents, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital documents. Accordingly, some method of protecting digital documents is necessary to make it more difficult to copy and distribute them without authorization.

Unfortunately, it has been widely recognized that it is difficult to prevent, or even deter people from making unauthorized distributions of electronic documents within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of "broadband" communications technologies (Nil) will render it even more convenient to distribute large documents electronically, including video files such as full length motion pictures, and thus will remove any remaining deterrents to unauthorized distribution of documents. Accordingly, DRM technologies are becoming very useful.

Two basic schemes have been employed to attempt to solve the document protection problem: secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as Cryptolopes by IBM™ and by InterTrust's™ Digiboxes fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered, i.e. unencrypted, by authorized users. This provides a basic form of protection during document delivery from a document distributor to an authorized user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is still a real challenge to existing technologies, current market trends suggest that open and untrusted systems such as PC's and workstations using browsers to access the Web, will be the dominant systems used to access copyrighted documents. In this sense, existing computing environments such as PC's and workstations equipped with popular operating systems (e.g., Windows™, Linux™, and UNIX) and rendering applications such as browsers are not trusted systems and cannot be made trusted without significantly altering their architectures. Of course, alteration of the architecture defeats a primary purpose of the Web, i.e. flexibility and compatibility.

U.S. Pat. No. 5,715,403, the disclosure of which is incorporated herein by reference, discloses a system for controlling the distribution of digital documents. Each rendering device has a repository associated therewith. Usage rights labels are associated with digital content. The labels include usage rights that specify a manner of use of the content and any conditions precedent for exercising the manner of use. U.S. Pat. No. 5,052,040 discloses the use of a label prefixed to digital files so that different users can have specific encryption capability and rights with respect to the same file.

Two basic approaches have been taken to control the distribution of documents over the Web. The first approach is the use of subscription based services in which the user is only granted access to content after paying a subscription fee. However, once the subscription fee is paid and the document is rendered by the browser, the user can copy, print, and modify the document, i.e. all control of the document by the publisher is lost.

The second approach is to utilize proprietary formats wherein the document can only be rendered by a select rendering engine that is obligated to enforce the publisher's rights. Of course, this approach requires the use of a single proprietary format and loses the ability to combine plural popular formats and the richness of content associated therewith. Further, this approach requires the user to use a proprietary rendering application that must be obtained and installed on the user's computer and requires development of the rendering application for each format to be rendered in a secure manner. Further, the documents must be generated or converted using non-standard tools.

Further, there are various known mechanisms by which functionality can be added to a standard rendering engine, such as a Web browser. For example, an ActiveX control can be automatically downloaded and executed by a Web browser. ActiveX is a set of rules for how applications should share information and ActiveX controls can be developed in a variety of programming languages, including C, C++, Visual Basic, and Java.

An ActiveX control is similar to a Java applet. Unlike Java applets, however, ActiveX controls have full access to the Windows™ operating system. Microsoft™ has developed a registration system so that browsers can identify and authenticate an ActiveX control before downloading it. Java applets can run on all platforms, whereas ActiveX controls are currently limited to Windows environments.

A scripting language called VBScript enables Web authors to embed interactive elements in HTML documents to initiate a download and installation of ActiveX controls and other functions. Currently, Microsoft's Web browser, Internet Explorer™, supports Java, JavaScript, and ActiveX, whereas Netscape's Navigator™ browser supports only Java and JavaScript, though its plug-ins can enable support of VBScript and ActiveX. However, the availability of various plug-in and add-on software for browsers further complicates the user experience and presents a variety of problems in implementing a reliable DRM system over the Web or other open networks.

VYOU.COM has developed a system for protecting intellectual property in documents distributed over the Web. The system includes a software plug-in, to the user's Web browser. The plug-in includes a proprietary rendering engine for the proprietary format in which documents are represented and transmitted. Accordingly, documents must be reformatted into the proprietary format and the plug-in rendering engine for the appropriate final viewing format is used in place of the standard browser rendering engine. This arrangement requires the rendering engine for each format must be developed. Therefore, this system is difficult to implement and loses the advantages of the Web as an open architecture.

The proliferation of the Web, and its usefulness in document distribution, makes it desirable to apply DRM features to Web browsers and other standard rendering engines without requiring the rendering engines to be rewritten. However, conventional DRM technologies are not easily adapted to use with Web browsers and other standard rendering engines because they require proprietary formats and rendering engines which contradict the open architecture of the Web. The inability to control application programs, such as Web browsers, independently from their rendering engines has made it difficult to apply DRM features over distribution networks.

Another roadblock to implementing DRM systems over the Web is the fact that often the fees paid for proprietary documents, particularly for limited rights in proprietary documents are relatively small. For example, in many cases, the fees for limited rights in proprietary documents may be less that one dollar ($1.00) U.S. In such cases, the expense associated with processing a credit card charge, including access fees, transaction fees, and the like are relatively large as compared to the entire document fee. For such relatively small transactions, often referred to as "micro-transactions," the use of a credit card for the corresponding "micropayment", i.e. relatively small payment, is not practical. Further, since each credit card transaction is processed as an individual charge, a customer purchasing a large volume of documents in various transactions, will generate a large number of small transactions which is not efficient for credit card transactions.

Various proprietary solutions have been developed for handling micropayments, and other payments, over the Internet. For example, CyberCash™, Inc. and ePayment Systems™, Inc. each provide such solutions. Also, Intellicent™ provides a specific solution for micropayments. However, these solutions are not integrated in a DRM environment.

SUMMARY OF THE INVENTION

An aspect of the invention is a method of dynamically protecting content in a system for managing use of the content in accordance with usage rights associated with the content. The method comprises receiving a request from a user device for content stored on a server, gathering information from at least one source to build the content in accordance with the request, mapping the content to usage rights, sending a reply including the usage rights to the user device, and permitting use of the content based on the usage rights under control of a security module for enforcing usage rights.

BRIEF DESCRIPTION OF THE DRAWING

The invention is described through a preferred embodiment and the attached drawing in which.

DETAILED DESCRIPTION

The invention is described below with reference to a preferred embodiment. It will be apparent that the invention can be embodied in a wide variety of forms, some of which may be quite different from those of the disclosed embodiment. Consequently, the specific structural and functional details disclosed herein are merely representative and do not limit the scope of the invention.

Figure 1:
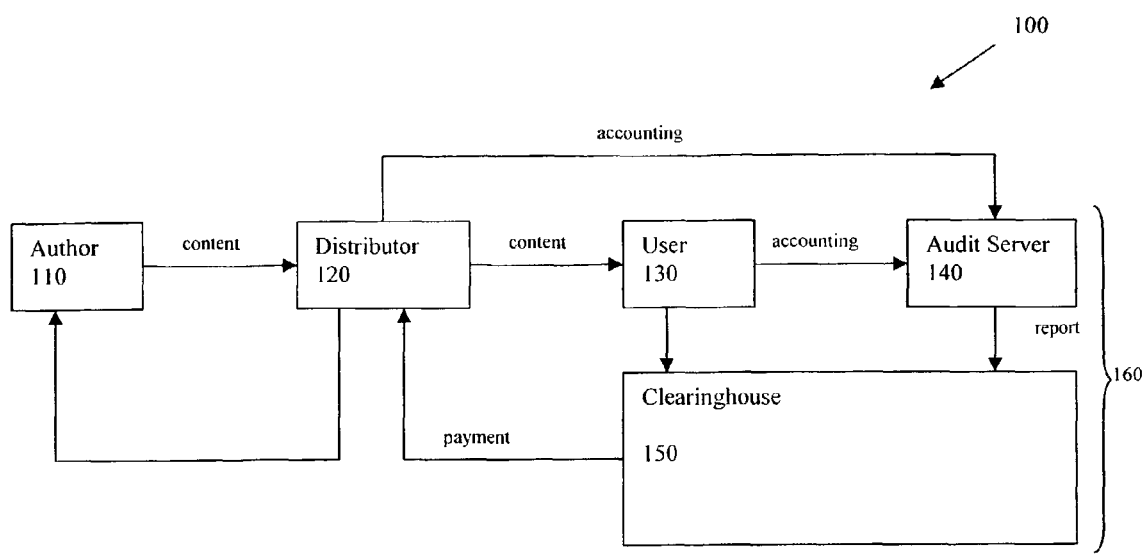
FIG. 1 is a block diagram of a document distribution system utilizing DRM technology.

FIG. 1 is a block diagram of a model for a system for the electronic distribution of digital documents. Author 110 creates original content 112 and passes it to distributor 120 for distribution. Ordinarily, author 110 is the creator of the content. However, the term "author" as used herein can be the creator, owner, editor, or other entity controlling the content or an agent (e.g. a publisher) of one of those entities. Also author 110 may distribute documents directly, without involving another party such as distributor 120, and thus the author and distributor may be the same entity. However, the division of functions set forth in FIG. 1 is more efficient, as it allows author 110 to concentrate on content creation and not the administrative functions of distribution. Moreover, such a breakdown facilitates economies of scale by permitting distributor 120 to associate with a number of authors 110. The term "document", as used herein, generally refers to any type of content, such as text, audio, or other data, including any encryption, formatting, or the like. The term "content", as used herein, generally refers to the underlying information of a document. However, these terms overlap and thus are used interchangeably herein.

Distributor 120 distributes documents to user 130 upon request. In a typical electronic distribution model, the content is distributed as a document in encrypted form. Distributor 120 encrypts the content with a random key and then encrypts the random key with a public key corresponding to user 130. Thus the encrypted document is customized solely for the particular user 130. User 130 is then able to use their private key to unencrypt the random key and use it to unencrypt and view the document.

Payment for the document is passed from user 130 to distributor 120 by way of clearinghouse 150 which collects requests from user 130 and from other users who wish to view a particular document. Clearinghouse 150 also collects payment information, such as debit transactions, credit card transactions, or other known electronic payment schemes, and forwards the collected payments as a payment batch to distributor 120. Of course, clearinghouse 150 may retain a share of the payment as a fee for the above-noted services. Distributor 120 may retain a portion of the batch payment from clearinghouse 150 for distribution services and forward a payment (for example royalties) to author 110. Distributor 120 may await a bundle of user requests for a single document before distributing the document. In such a case, a single encrypted document can be generated for unencryption by all of the requesting users 130.

Each time user 130 requests (or uses) a document, an accounting message is sent to audit server 140 which ensures that each request by user 130 matches with a document sent by distributor 120. Accounting information is received by audit server 140 directly from distributor 120. Any inconsistencies are transmitted via a report to clearinghouse 150, which can then adjust the payment batches made to distributor 120 accordingly. This accounting scheme is present to reduce the possibility of fraud in electronic document distribution and to handle any time-dependent usage permissions that may result in charges that vary, depending on the duration or other extent of use. Audit server 140 and clearinghouse 150, in combination, can serve as transaction aggregator 160 which functions to aggregate plural transactions over a period of time, and charge distributor 120 in an appropriate manner to reduce the accounting overhead of distributor 120. The model for electronic document distribution illustrated in FIG. 1 can be applied to the electronic document distribution system of the preferred embodiment disclosed herein. Further, content can include usage rights as described above.

Figure 2:
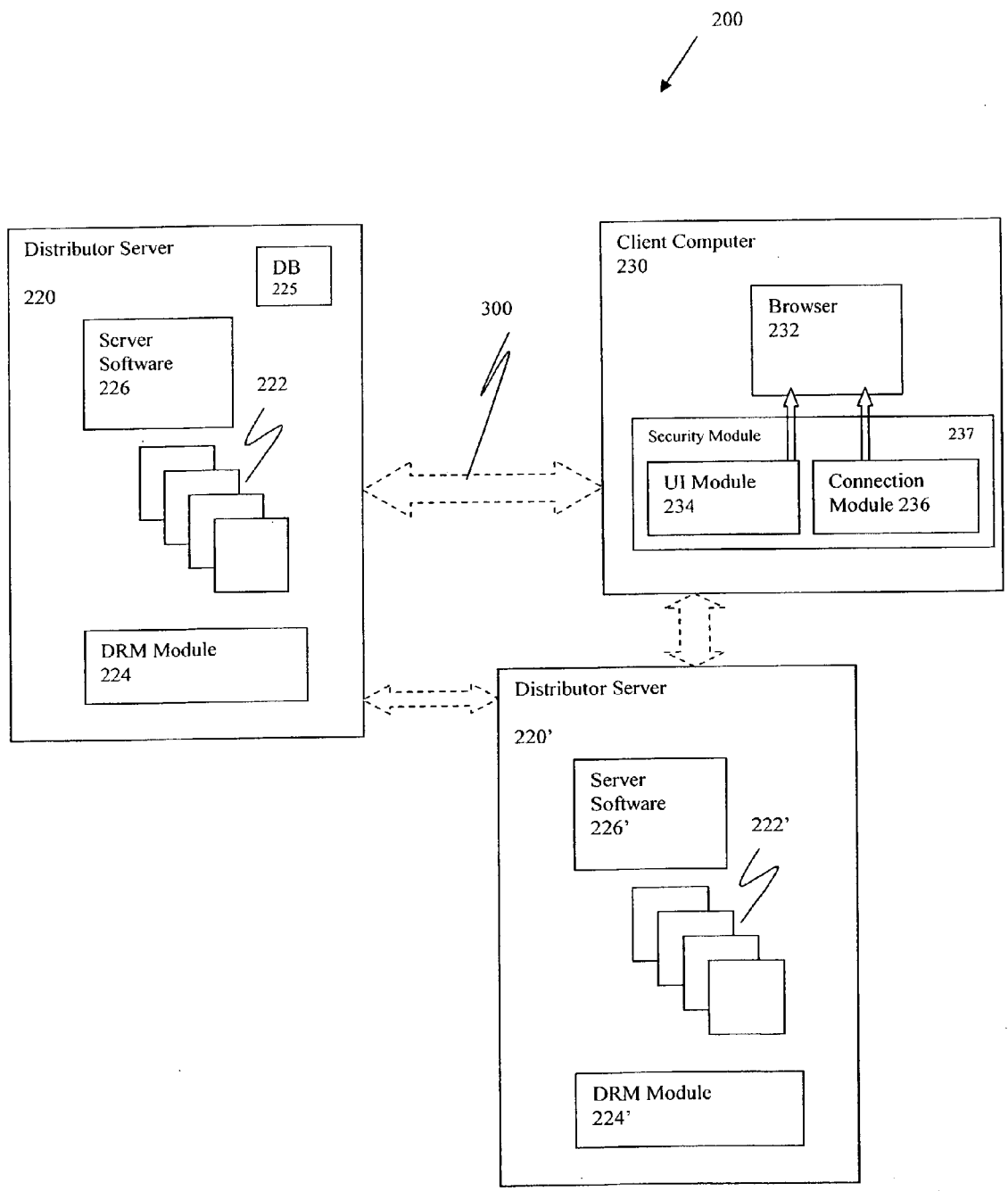
FIG. 2 is a schematic representation of a DRM system of the preferred embodiment.

FIG. 2 is a schematic representation of a computer architecture of a document distribution system in accordance with a preferred embodiment of the invention. As noted above, the invention can be used in connection with known models for effecting accounting and payment of fees, such as use of a clearinghouse and an audit server. Further, the invention can be used in connection with various commerce models. Accordingly, the apparatus for auditing distribution, effecting payment, and authoring a document is not described in detail herein and is omitted from the discussion of the preferred embodiment to simplify description thereof.

As illustrated in FIG. 2, digital content distribution system 200 comprises distributor server 220, corresponding to distributor 120 described above, and client computer 230, corresponding to user 130 described above. Server 220 and client computer 230 can be general purpose computers programmed to accomplish the desired functions. For example, server 220 can be a standard server or workstation running the Windows NT™ operating system and including HTTP server software 226 such as Apache™ or another HTTP server. Client 230 can be a personal computer running the Windows™ operating system. In the preferred embodiment, server 220 and client 230 are each coupled to communications network 300, such as the Internet, or more specifically, the Web. Accordingly, client 230 includes browser 232 as a standard application program having a rendering engine. Browser 232 can be any HTTP compliant browser, such as Microsoft Internet Explorer™ or Netscape Navigator™. The phrase "standard application program", as used herein, refers to any application program designed to accomplish a task, such as document creation, viewing and editing, and having a rendering engine. Examples of standard application programs include word processors, Web browsers, editors, viewers, spreadsheet programs, database programs, and the like.

Server 220 has a plurality of documents 222 stored thereon, in the form of Web pages, for distribution. Documents 222 can be stored in an encrypted format. The term "encrypted", as used herein, refers to any mechanism by which accessibility of content is partially or completely prohibited, such as by use of asymmetric or symmetric encryption algorithms, scrambling algorithms, or the like. Server 220 also includes digital rights management module 224, in the form of software, for storing and managing usage rights associated with particular ones of documents 222, users, and/or payment amounts or other conditions. Other functions of rights management module 224 are described in greater detail below. Distributor server 220 can be part of a server farm or other group of computers, which can also include distributor server 220' as illustrated in FIG. 2.

Client 230 also has user interface (UI) module 234 and connection module 236 each in the form of software and each adapted to attach to browser 232 without the need for modification of browser 232. For example, UI module 234 and connection module 236 can be in the form of plug-ins, ActiveX controls, or in any form that allows attachment to the rendering engine of browser 232 without the need for modifying the code of browser 232. Such attachment is described in greater detail below. In combination, UI module 234 and connection module 236 constitute a security module which is described in detail below. While security module 237 is illustrated as residing in client computer 230, it will become clear that security module 237 can include client side components and server side components. For example, DRM module 224 described below can be a server side component of security module 237.

Rights management module 224 is a server side component that can store labels of usage rights and identify which rights are associated with each document 222. The rights also can vary based on the identity of the user requesting access to document 222, any payment made by the user through a clearinghouse or the like, and any other conditions. For example, the user may have the option of paying one fee to view document 222 or a higher fee for viewing and printing the same document 222, as is well known. Rights management module 224 is also operative to deliver the appropriate list of rights along with the document, via communications network 300, to connection module 236 of client 230 as described below.

Connection module 236 can be a client side software component which verifies the integrity of the environment of client 230 by verifying that UI module 234 is attached to browser 232, identifies the user of client 230, i.e. the person requesting content, retrieves the document and the appropriate list of rights sent by rights management module 224, and in appropriate circumstances, unencrypts any retrieved documents that are encrypted and generates any necessary signatures and/or keys. UI module 234 can be a client side component that monitors requests from the user to access content of documents 222 and either grants or denies the request based on the list of rights retrieved by connection module 236. Further, UI module 234 can disable specified functions of browser 232 and the operating system of client 230 based on the list of rights in the manner described below, by interfacing with the operating system API and intercepting and redirecting commands for example. Connection module 236 verifies that the industry standard rendering engine running in the environment of client 230 has not been tampered with or otherwise compromised in a way that may allow the user to access protected content in a way that by passes UI module 234.

The invention can be implemented in connection with known client/server networking architectures, such as the Web, without modifying obviating, or bypassing the standard client software, server software, and rendering engines. Rights management module 224 is installed in server 220 along side the existing server software 226. As noted above, rights management module 224 identifies which rights are associated with documents 222 existing on server 220 or later stored on server 222. For example. Rights management module 224 can have a programmable database, lookup table or the like including the various rights associated with each document 222 and other variables, such as the identity of the user and the payment made by the user, in a well known manner. Rights management module 224 further interfaces with the operating system API of server 220 to cause server software 226 to only respond to connections from client(s) 230 having the proper components of security module 237, such as connection module 236 and UI module 234. Also, rights management module 224 serves as in interface with database 225 described below.

Figure 3:
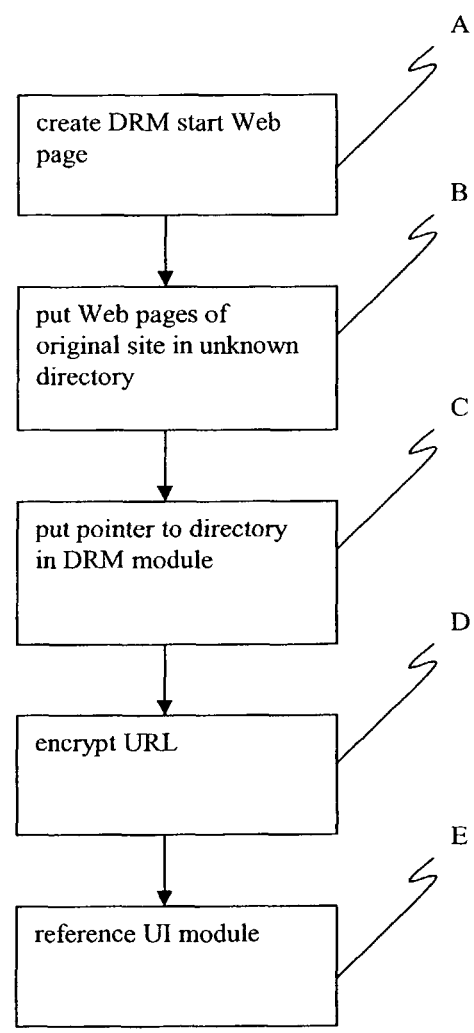
FIG. 3 is a flowchart of a method of operation of the preferred embodiment for causing the server to respond only to a protected client.

For example, once rights management module 234 is installed the procedure illustrated in FIG. 3 is accomplished. In step 302, a new DRM start Web page, or other secure interface display, is created which references UI module 234 and the existing server start Web page. In step 304, the various Web pages of a Web site on server 220 can be placed in a directory having a random label or any unknown directory. In step 306, rights management module 224 is programmed to include a pointer to this directory and, in step 308, rights management module 224 encrypts the URL of this directory. In step 310, the start DRM Web page is modified to reference UI module 235 which can instruct connection module 236 to unencrypt the encrypted URL to permit access to original start page and the rest of the Web site. If client 230 does not have UI module 234 and connection module 236, the URL cannot be unencrypted and thus the Web site on server 220 cannot be accessed.

Alternatively, connection module 236 can generate a signature and send the signature to server 220 with any URL request to server 220. Access to the Web site on server 220 will only be granted if the signature is present and valid. In this alternative, rights management module 224 can include code to validate the signature.

When a user of client computer 230 attempts to access server 220 having rights management module 224, rights management module 224 verifies if all required components of security module 237 UI module 234, such as are installed on client 230 as described above. If not, instructions in the DRM start Web page, in the form of a java applet, ActiveX control, or the like, instruct browser 232 to download and install UI module 234 in the manner described in greater detail below. Download can be accomplished from server 220 or another server coupled to communications network 300. Such download and installation can be accomplished in a known manner using conventional mechanisms, and the user can be prompted to authorize installation and to enter other necessary information, such as where to store the installation files. Connection module 236 can be imbedded in UI module 234 and downloaded and installed simultaneously or through a separate download and installation process. Of course, if UI module 234 is detected as installed on server 230, the installation step can be skipped. If UI module 234 is not installed on client 230, and the user does not authorize such installation, access to documents on server 222 is prohibited, or limited only to documents specified as being freely distributable.

As noted above, UI module 234 and connection module 236 are in a form in which they can be attached to browser 232 without the need to modify the code of browser 232. The term "attached" as used herein with respect to the modules, refers to software modules that can be combined or coupled with browser without modifying the code of browser 232. For example, UI module 234 and connection module 236 are in the form of plug-ins, in the case of Netscape Navigator™ or ActiveX Controls in the case of Internet Explorer™. The mechanisms for developing and installing such components are well known.

Figure 4:
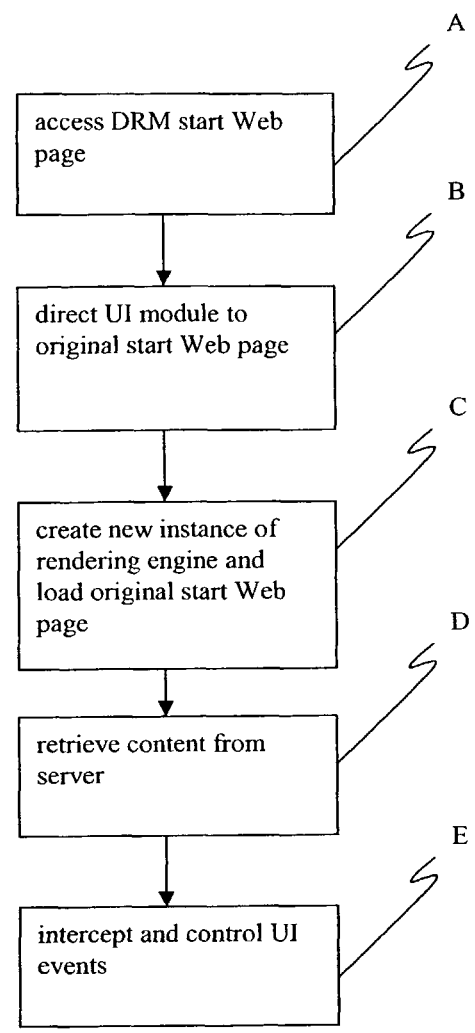
FIG. 4 is a flowchart of a method of operation of the preferred embodiment for accessing protected content.

A procedure for accessing protected content, in the form of documents 222, stored on server 220 is illustrated in FIG. 4. In step 402, the DRM start Web page is accessed through its URL in a known manner. In step 404, the DRM start Web page directs UI module 234 to the original start page or pages referenced by the DRM start Web page using one of the methods described above. In step 406, UI module 234 creates another instance of the rendering engine of browser 232, loads the original start Web page, and instructs the operating system to display the new instance in a browser window, using known techniques. The new instance is directed, by UI module 234, to retrieve content from server 220 through connection module 236 in step 408. In other words, in the preferred embodiment, UI module 234 intercepts commands from browser 232 and redirects them through connection module 236. UI module 234 can instruct the new instance to utilize a secure asynchronous protocol through connection module 236 as describe in greater detail below. Therefore, UI protection is validated and all user interface events, can be intercepted and controlled in step 410. For example, when the user initiates a "print" or "copy" command through the standard user interface of browser 232, UI module 234 intercepts the request and only permits response if the set of rights received by connection module 236 permits the requested function to be carried out.

More specifically, when connection module 236 receives a request from the rendering engine of browser 232, connection module 236 validates that the rendering engine is protected by UI module 234, i.e. UI module 234 is attached, and that the rendering engine has not been tampered with or otherwise compromised. If so, connection module 236 permits connection to rights management module 224 of server 220 and negotiates permission to retrieve the original start Web page on server 220 and the set of rights for the user for the Web page. Rights management module 224 then initiates a connection between server software 226 of server 220 and connection module 236 of client 230. The connection can be established using any protocol, such as HTTP or HTTPS or any other standard or proprietary connection protocol.

The requested document 222 is then retrieved and delivered to connection module 236 which unencrypts document 222, if encrypted on server 220, and delivers the document in unencrypted form to the new instance of the rendering engine of browser 232 along with the set of rights associated with the document. Once again, the contents of the set of rights may be determined based on the document, the user's identity, a payment made by the user, or any other appropriate parameter. Connection module 236 then transmits the set of rights to UI module 234 which limits the functions available to the user based on the set of rights by controlling the new instance of the rendering engine of browser 236 as described above.

The content of the document is now viewable in a window of browser 232 as any other Web page would be. However, browser 232 does not have direct access to the Web page of the document because browser 232 is "wrapped" by UI module 234 or other components of security module 237 as will be described below. UI modules 234 prevents browser 232 from performing any prohibited functions outside of the scope of the set of rights for the document.

The preferred embodiment utilizes a standard rendering engine of an application program, such as a browser, a word processor, or any other application or display program. The preferred embodiment achieves this by interfacing with the application and standing between the application and the document to control access to the document. Accordingly, a separate proprietary rendering engine for each document format is not required. Further, any data format supported by the application will be supposed by the invention without modification. It can be seen that the preferred embodiment permits DRM systems to be adapted to standards, such as TCP/IP and the use of browsers to render HTML. Further, the preferred embodiment facilitates various functionality that permits DRM to be applied to systems in a manner that is transparent to the user. Several examples of methods of operation of document distribution system 200 are described below.

Figure 5:
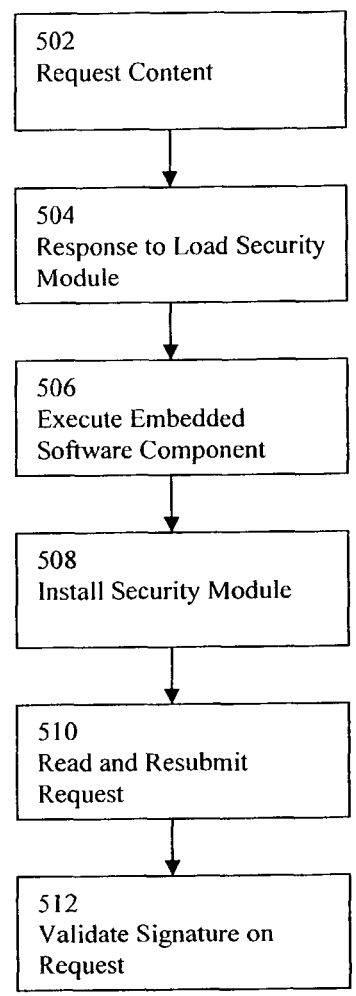
FIG. 5 is a flowchart of a method of operation of the preferred embodiment for installing a security module.

In the first example, client computer 230 initially does not have all required components of security module 237 installed therein. As illustrated in FIG. 5, client computer 230, makes a request of distributor server 220 for one or more documents 222 in step 502. Distributor server 220 analyzes the request and based on a lack of signature information within the request (indicating that components of security module 237 are not loaded in client computer 230), sends a response to client computer 230 to load the requisite components of security module 237 in step 504. As noted above, security module 237 functions to enforce usage rights in client computer 230. The response sent in step 504 is specific to the type of client requesting the content. If the client software on client computer 230 is a Web browser, for example, distributor server 220 will send a response that is a Web page including an executable software component. For example, the software component can be in a standard form such as Java Script or Active Server Pages. In addition the response, a Web page in the preferred embodiment, can include a copy of the unsigned request for content sent in step 502.

Client computer 230 receives the Web page and executes the software component that includes information about where to get the components of security module 237, in step 506, to request a copy of the components. Client computer 230 receives and installs the components of security module 237 in step 508. Security module 237 is configured to automatically begin to run in browser 232, using the mechanism described above for example. In step 510, security module 237 then reads the copy of the original request for content 222 contained in the Web page which invoked security component 237 and resubmit the request to distributor server 220 with a digital security signature. In step 512, distributor server 220 receives the signed request and validates the signature on the request. Because this request is properly signed by security module 237, distributor server 220 delivers the document 222 to security module 237 installed on client computer 230 for rendering by browser 232 in accordance with usage rights and conditions associated with the content of document 222. The method illustrated in FIG. 5 provides for auto-engaging security control to seamlessly and transparently provide the client with the software that the user needs to render content 222 in a secure manner. Security module 237 can include a software agent that is-operative to analyze any rendering engine or other components of client computer 230, in step 508, to validate that the client environment is secure. Security module 237 can resubmit the request, in step 510, after such validation.

Figure 6:
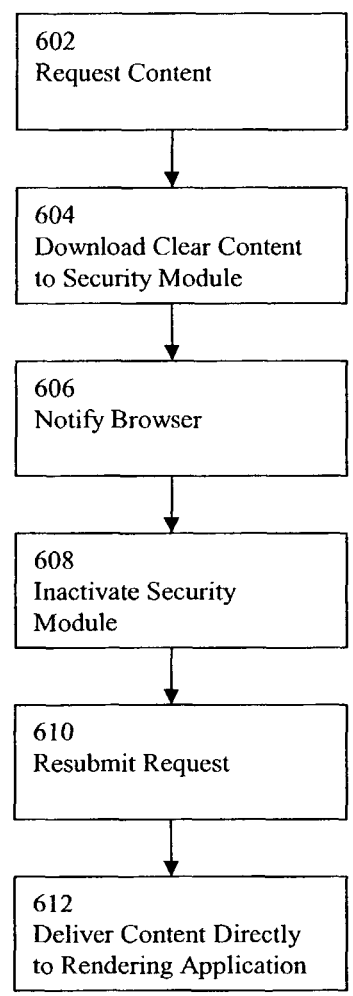
FIG. 6 is a flowchart of a method of operation of the preferred embodiment for inactivating a security module.

FIG. 6 illustrates another example of a method of operation of the preferred embodiment. In step 602, security module 237 is directed to retrieve a document 222 from distributor server 220 server. In this example, document 222 is "clear content," i.e., is not encrypted or otherwise obscured or limited and does not have any use restrictions. Document 222 is returned by server 220 to security module 237 in step 604. Because document 222 is not signed, or encrypted, or otherwise marked as content that needs to be handled by security module 237, security module 237 recognizes that it is no longer required. In step 606, security module 237 notifies browser 232 that browser 232 should request document 222 directly by sending the original request for content to server 220. Security module 237 then removes itself as a running component, i.e., inactivates, in step 608 to preserve resources of client computer 230. In step 610, browser 232 then resubmits the request for document 222 that was originally sent by the security module 237. Distributor server 220 then delivers documents 222 directly to browser 232 in step 612.

In order to maintain security and enforce usage rights, all requests for content are initially made through security module 237. However, when the request returns content that does not require security, security module 237 becomes a potential liability because it utilizes computer resources. In this example, if security component 237 is not needed, it is removed from a running state.

System 200 can use PKI encryption technology or any other encryption, ciphering, or watermarking technology. Of course, each technology requires that a client making a request for content be identified as an authorized user. A digital certificate or signature can be used for identification purposes. In other words, an attachment to an electronic message used for identification purposes is sent with a message. The most common use of a digital certificate or signature is to verify that a user sending a message is who he or she claims to be, and to provide the receiver with the means to encode a reply, e.g., an encryption key. An individual wishing to send an encrypted message can apply for a digital certificate from a Certificate Authority (CA). The CA issues an encrypted digital certificate containing the applicant's public key and a variety of other identification information. The CA makes its own public key readily available, through the Internet for example. The recipient of an encrypted message uses the CA's public key to decode the digital certificate attached to the message, verifies it as issued by the CA and then obtains the sender's public key and identification information held within the certificate. With this information, the recipient can send an encrypted reply. The most widely used standard for digital certificates is X.509.

Figure 7:
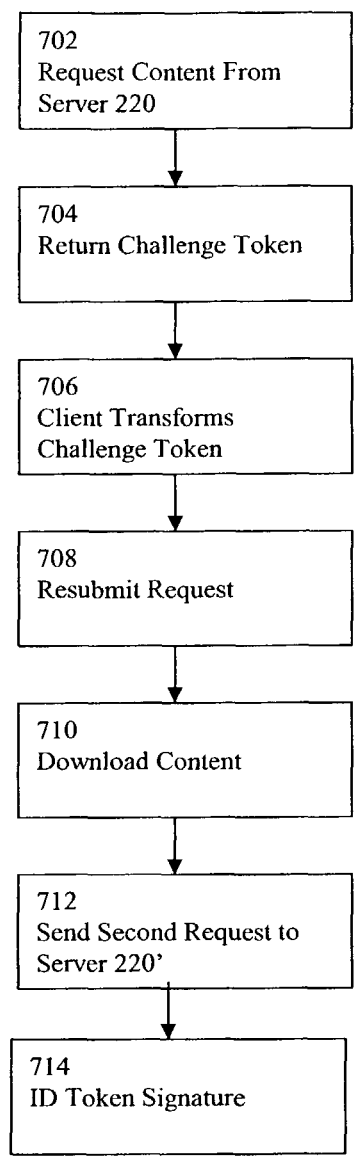
FIG. 7 is a flowchart of a method of operation of the preferred embodiment for facilitating authentication of a client for multiple servers.

This identification process can be cumbersome when repeated at each server from which content is requested. FIG. 7 illustrates another example of a method of operation of the preferred embodiment in which the identification procedure at plural servers is expedited.

As illustrated in FIG. 7, client computer 230 requests document 222 from distributor server 220 in step 702. Assuming that PKI encryption schemes are used, the request can be in the form of "PrivateClient[request]" in which the request is encrypted with a private key of client computer 230. Distributor server 220 looks at the signature of the request and recognizes that the request is not from an authenticated client and generates a unique "challenge" token which is returned to client computer 230 in step 704. In the preferred embodiment, the challenge token can be in the form of "PrivateServer [PrivateClient[request]]" in which the original encrypted request is encrypted again using the private key of distributor server 220.

Client computer 230 answers the challenge taken by transforming the challenge in a unique way, i.e., signing the challenge token, in step 706. For example the transformation can be in the form of encryption of the challenge token with the public key of distributor server 220. In such a case, the transformation will be in the form of [PublicClient[PrivateServer [PrivateClient[request]]]." Client computer 230 then resubmits the request to the distributor server 220 with the transformed challenge token in step 708. Distributor server 220 establishes authentication with the client by recognizing the transformation. i.e. recognizing the challenge token as its own, and returns the requested document 222 in step 710.

In many cases, distributor server 220 is part of a server farm or other set of related computers as noted above. Therefore, there is no guarantee that the server that gets the next request for this session will in fact be the same server that generated the "challenge" token. For example, the next session request may be received by distributor server 220'. When client computer 230 sends another request reusing the same challenge token and the request is received by distributor server 220', in step 712, distributor server 220' looks for the signature of the challenge token, and finds that the signature belongs to distributor server 220, in step 714. Since distributor server 220 has a trusted relationship with distributor server 220', distributor server 220' will honor the challenge token of distributor server 220. In particular, distributor server 220' evaluates the transformation of the challenge token performed by the client and authenticates the client by identifying server 220 as the creator of the challenge token. In step 716, content 222' is delivered from distributor server 220' to client computer 230.

In this method of operation a token supported by other related servers is honored by a server receiving a request. In order to simplify the process, keys are not exchanged again. The approval of a previous key exchange with a related server is used for any other server in a group of related servers to speed up the process of authentication.

As noted above, the use of a standard rendering engine presents significant complications for DRM systems. For example, when using a browser as the rendering engine, the standard user interface includes copy and print commands and other commands not necessarily compatible with DRM systems. It is known to disable such commands in which case most GUIs, such as the Windows GUI, will shadow the menu selections corresponding to disabled commands. However, this is often confusing and not ascetically pleasing. Further, it may be desirable to provide content specific menu selections, such as choices of usage rights and conditions for exercise thereof, such as fees to be paid. Further, a content vendor may want to present a proprietary branded user interface or a user interface that is consistent with other vendors. Also, it may be desirable to highlight menu selections, such as a print button, under certain circumstances.

Figure 8:
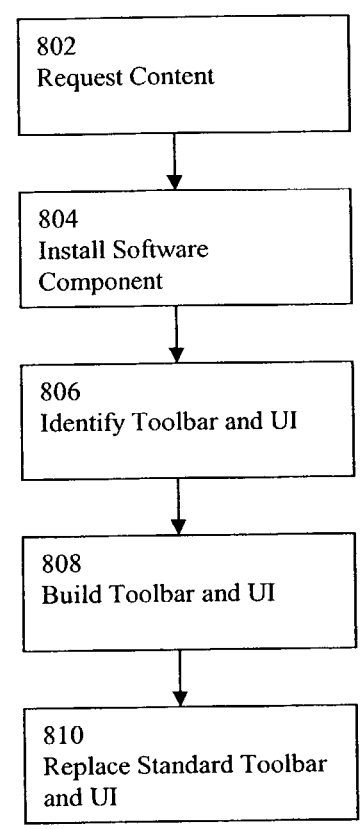
FIG. 8 is a flowchart of a method of operation of the preferred embodiment for permitting a service to control the user interface of a client.
Figure 9:
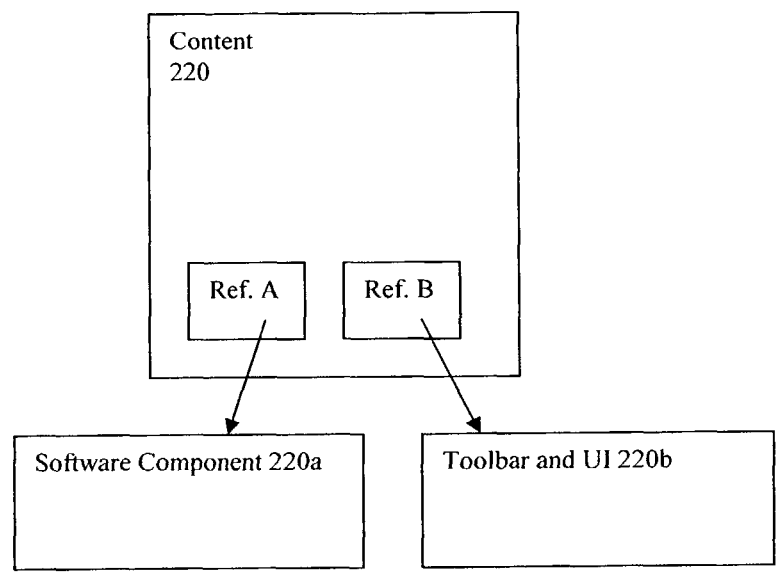
FIG. 9 is a block diagram of content having references to user interface components.

FIG. 8 illustrates a method of operation of the preferred embodiment which permits content specific toolbars to be displayed as the user interface of browser 232. Documents 222 are stored on distributor server 220, as described above, in a form compatible with the rendering application, a Web page in the preferred embodiment. Documents 222 are illustrated in detail in FIG. 9 and include reference A to software component 220a and reference B to description of a browser toolbar and UI 220b. Software component 220a can be in the form of a Java applet, an Active X control, or the like. As the content is rendered, the reference to the software component is identified by the browser i.e. ActiveX Control, Java applet.

Referring to FIG. 8, browser 232 requests document 222 in step 802. Browser 232 attempts to render document 222 and follows reference A to thereby execute software component 220a in step 804. Software component 220a then looks at content 222 that invoked it and identifies reference B to description of toolbar and UI 220b in step 806. Software component 220a then is operative to build a platform/browser specific toolbar and UI based on description 220b in step 808. In step 810, software component 220a removes or hides the standard browser UI and tool bar and replaces them with those built in step 808. This method of operation permits the Web site (distributor for server 220 in this case) to dictate the navigation's motif, look, and appearance and thus tailor the user's browser to the site, customizing buttons, colors, patterns, animations, menus, and tool bars.

Figure 10:
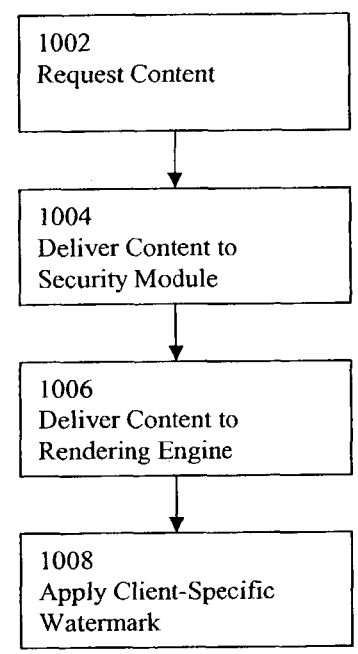
FIG. 10 is a flowchart of a method of operation of the preferred embodiment for applying client-specific watermarks.

FIG. 10 illustrates another manner of operation of the preferred embodiment in which a client-specific, or even instance specific, watermark can be applied to content for security and tracking purposes. The concept of digital "watermarking" is well known generally and allows content owners to imbed information within graphics and audio files that can be used to identify the owner's rights to these works. The term "digital watermark" is derived from the traditional watermarks that exist in high-quality letterhead and certain currency. Traditional watermarks typically are not apparent to the reader, but, when held to the light, reveal the name or logo of the paper's manufacturer or the entity using the letterhead. Similarly, digital watermarks also serve the purposes of identifying quality and assuring authenticity. A graphic or audio file bearing a digital watermark can contain information relating to the content owner or other information. Digital watermarks may be only perceptible under certain conditions, such as when content is printed in an unauthorized manner. In graphic images, for example, digital watermarks alter the image to provide digital information supplied by the party who imbedded the watermark. The watermarks may be viewed with stand-alone or plug-in software and can reveal, for example, a unique identification code that can be traced to the copyright owner or more complete copyright ownership information.

As illustrated in FIG. 10, client computer 230 requests document 222 from distributor server 220 over communications channel 300 in step 1002. Distributor server 220 delivers document 222 to security module 237 in step 1004. Note that document 222, as delivered to security module 237, may or may not have a watermark embedded therein. In step 1006, security module 237 delivers document 222 to an instance of the rendering engine, browser 232 in the preferred embodiment, for rendering in the manner described above. Security module 237 then uses instance-specific information relating to the instance of the rendering engine used to render content 222 to apply a client-specific watermark to the window that the instance of the rendering engine uses in step 1008. The client-specific watermark can be applied using any techniques or algorithms for watermarking. Also, the client-specific watermark can be applied in addition to an existing watermark. The client-specific watermark data can be stored or generated in any manner.

In either case, because the watermark is applied on the client, it can be unique to that client, and thus be traceable. Distributor server 220 can deliver identical document 222 to all clients (thus minimizing server side performance impact). The client then applies a unique watermark using, for example, translucent windows to the image. If the consumer of the content then uses screen capture or another unauthorized mechanism to capture the content, the captured content is then watermarked with an ID that is unique to that user for tracking and enforcement purposes.

Figure 11:
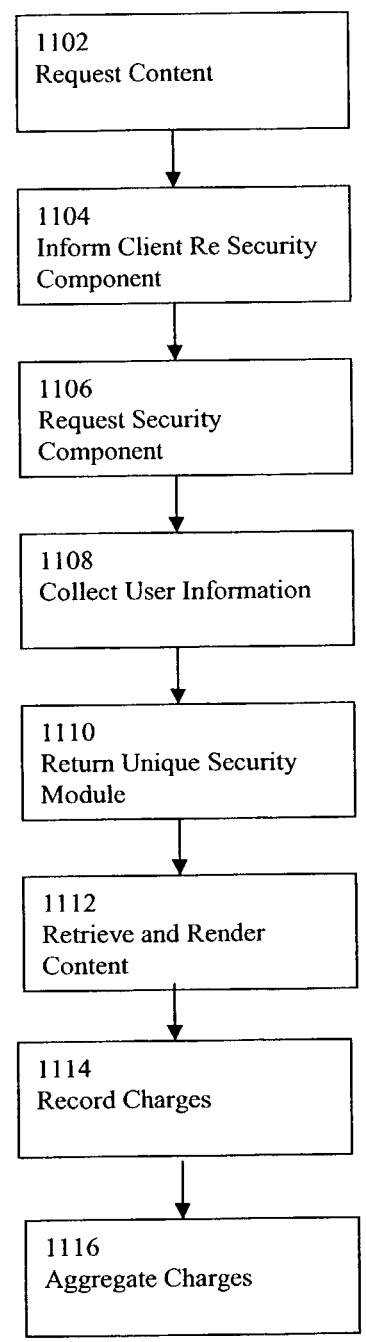
FIG. 11 is a flowchart of a method of operation of the preferred embodiment for aggregating transaction information.

FIG. 11 illustrates a manner of use of the preferred embodiment in which transaction payments are easily aggregated. In step 1102 client computer 230, prior to installation of the requisite components of security module 237, requests document 222 from distributor server 220. In step 1104, distributor server 220 then informs client computer 230 that document 222 is protected and client computer 230 needs to have security module 237 to render document 222, and where security module 237 can be acquired. In this case, security module 237 can be acquired from a computer associated with transaction aggregator 160 (See FIG. 1). In step 1106, client computer 230 requests the requisite components of security module security module 237 from transaction aggregator 160 by opening a session with the computer associated with transaction aggregator 160. In step 1108, transaction aggregator 160 requests and collects various user information including billing information and the like for example in a conventional manner.

Transaction aggregator 160 generates a unique security module 237 with a hidden unique public private pair or other indicia of the identity of client computer 230, and returns security module 237 to client computer 230 in step 1110. Security module 237 creates a protected instance of browser 232, or other $3^{rd}$ party rendering application, enforces access protection around it, and instructs it to retrieve and render protected content 222 from distributor server 220 in step 1112. Distributor server 220 recognizes document 222 is being requested by a rendering engine that has been protected with security module 237. And returns document 222.

The protected rendering application, e.g. browser 232 with security module 237 attached, informs security module 237 that it is about to render document 222. In step 1114, security module 237 analyzes what the digital rights are associated with document 222, and records an appropriate charge back to transaction aggregator 160. Transaction aggregator 160 tracks many small transactions performed against many forms of content accessed by this instance of a public private key, then aggregates them into a single charge periodically to a financial institution or other party associated with the indicia in security module 237.

The method of FIG. 11 permits a user to log on to a new Web site to initiate a transaction. If the user's information is already on file at a trusted site (such as transaction aggregator 160) the new Web site verifies the user through the trusted site. The trusted site reconciles all of the transactions and sends the results to the appropriate entity periodically, monthly for example. Accordingly, the burden of handling the transactions (often of small denominations) is shifted from the distributor or credit agency to the aggregator, which reduces the overall cost of transactions.

The new Web site does not have to obtain the detailed information of the user, which reduces concerns over privacy issues. In addition, the login process for the new Web site is simplified. Because the Website uses only an anonymous ID sent to the trusted site, and only the trusted site has the user's personal and credit information, the user's information is protected from the new Website that the user is transacting with.

Figure 12:
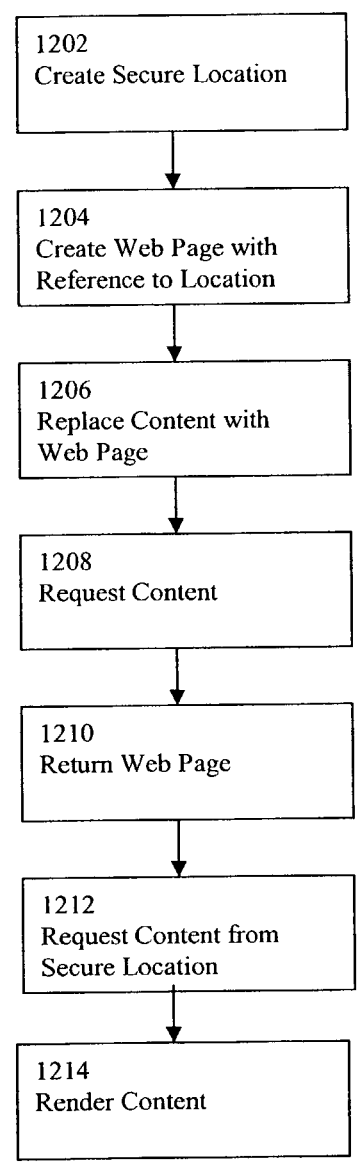
FIG. 12 is a flowchart of a method of operation of the preferred embodiment for address obfuscation.

Another method of operation of the preferred embodiment utilizes directory obfuscation for security without the need for a server side executable component. As illustrated in FIG. 12, the content owner, or other party having an interest in documents 222 creates a subdirectory on distributor server 220 with a random name, or other difficult name to discover, to serve as a secure location of documents 222 in step 1202. The interested party then creates a Webpage which has a reference to security module 237 and an encrypted form of the new secure location of the documents 222 in step 1204. The protected documents 222 are then replaced with the Web page, in step 1206, and protected documents 222 are moved into the secure directory.

In step 1208, client computer 230 issues a request to retrieve a document 222 from the original directory in the manner described above. The security Webpage which has the secret location of the content encrypted in it is returned instead of the requested document in step 1210. Security module 237 decrypts the location of the content referenced by the Web page and requests document 222 from the secure location in step 1212. The content is delivered to security module 237 which creates an instance of a protected rendering engine, e.g. browser 232 in the preferred embodiment, and renders document 222 in step 1214.

The method of operation described above does not require a server side executable and thus is an inexpensive way to provide adequate, while not necessarily maximum, security. In this example, the content is stored in a location having and address determined by a random number (or a pseudo-random number), for security purposes. Then, when the user initiates a transaction, the user is presented with an HTML page having the location in an encrypted form. The security component decrypts the location and the client never discovers the location.

Figure 13:
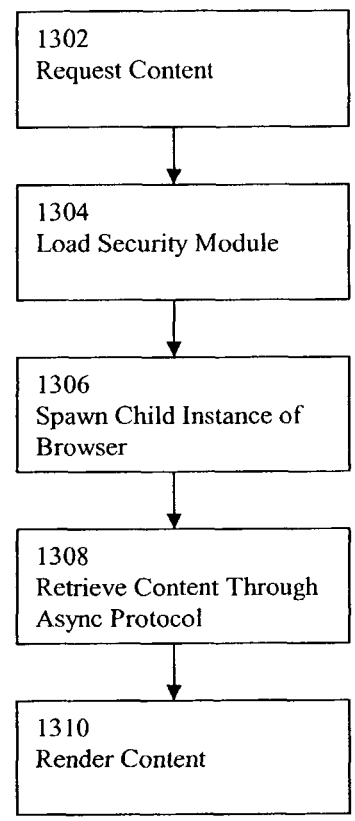
FIG. 13 is a flowchart of a method of operation of the preferred embodiment for using an asynchronous protocol for HTTP document transfer.

FIG. 13 illustrates another method of operation of the preferred embodiment which utilizes relative addressing for security. In step 1302 web browser 232 of client computer 230 requests content from distributor server 220. Distributor server 220 recognizes that the content request is not coming from an appropriate security module 237 (by the lack of a proper signature for example), so it instructs client computer 230 to load the requisite components of security module 237 in step 1304. In step 1306, security module 237 spawns a child HTML rendering engine, i.e. instance of browser 232, inside the existing instance of browser 232 so that it can have full control of the child HTML rendering engine. Security module 237 then instructs the child instance to retrieve content through an asynchronous protocol installed in security module 237 instead of through ordinary HTTP protocol and addressing in step 1308. For example, the asynchronous protocol can be HTML with Active X controls embedded therein to establish a secure authenticated communication channel. The asynchronous protocol can direct browser 232 to retrieve content through another Web site that includes filtering technology to prevent access from unwanted or unauthorized users. Document 222 is rendered in step 1310.

For example, the asynchronous protocol can send the address of the user to a third party for verification that the user is wanted and authorized. The asynchronous protocol can cause the child instance of browser 232 can request the top level HTML page via a designated secure Web site. After the top level page loads, the child instance can use an address prefix to retrieve all of the component parts of the page. Unprotected content can be retrieved via standard HTTP.

Generally, security is handed to HTML for rendering. However, in this example, content is retrieved using a proprietary asynchronous protocol. Therefore, a single instance of an HTML rendering engine can be used to "pull" compound pieces of content. As an example, standard HTML rendering can be used to access a start Web page containing an Active X control in it. The control spawns a child rendering engine which retrieves content through a specified server, which in turn accesses the server side, which includes the filtering technology or the like. Note that a Web page (a compound document) has references to other files and images. Conventionally, only the top level (HTML page) is protected, and the references are not protected. However, in this example, since requests are handled through a secured server, both the top level and the references are secure.

Figure 14:
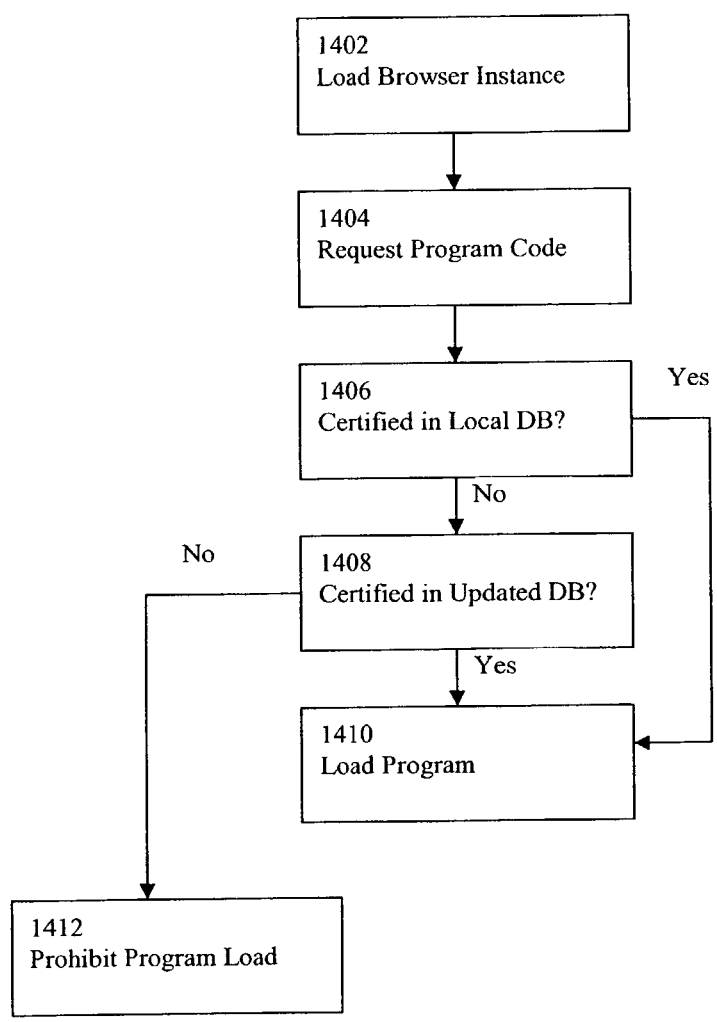
FIG. 14 is a flowchart of a method of operation of the preferred embodiment for dynamic certification of software.

FIG. 14 illustrates another method of operation of the preferred embodiment. This method provides security by prohibiting the loading of code, such as plug-ins and Dynamic Link Libraries (DLLs), into the rendering engine unless the code is certified as not compromising security. This method recognizes that certification can be a dynamic process that should permit users to use certified software immediately upon certification.

In step 1402 security module 237 of client computer 230 loads an instance of a rendering application, browser 232 in the preferred embodiment. Browser 232 requests to load a third party add in program, such as DLL, in step 1404. Security module 237 intercepts the request and querys local database 225 including a list of trusted certified third party add in programs in step 1406. If security module 237 does not find the third party program that is attempting to load, security module 237 contacts a trusted server to update its database of trusted third party programs that are certified in step 1408. If the third party program is found in the updated list, security module 237 permits the loading of the third party program into the rendering engine in step 1410. If the determination in step 1406 is that the program is certified by being listed in database 225, the method goes directly to step 1410. If the determination in step 1408 is that the program is not in the updated database as being certified, loading is prohibited in step 1412.

Whenever the rendering application wants to load any executable code, it should be approved, i.e., certified, to avoid compromising security. If at the time of shipment of the security component a third party product is not ready for certification, it cannot be included in the approved list in the security module. If the program is approved later, the signature of the program will be compared to a list updated by logging onto to a server having and updated certification database, data base 225 for example.

Figure 15:
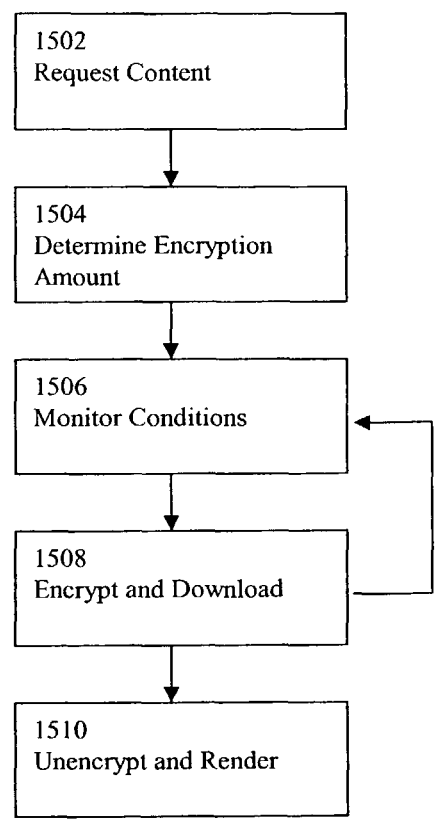
FIG. 15 is a flowchart of a method of operation of the preferred embodiment for dynamic variable encryption.

FIG. 15 illustrates a method of operation of the preferred embodiment which is well suited for the transfer of content in the form of video or other large files. It is known to encrypt only portions of data to reduce overhead and data transfer speed while still providing a level of security. However, in the method illustrated in FIG. 15, the percentage of encryption of a data stream is adaptive based on network latency, connection speed and other factors. In step 1502, document 222 is requested by client computer 230. Distributor server 220 determines what percentage of encryption to use by examining a database, usage rights, or other indication of encryption associated with document 222 in step 1504. Such information can be stored in digital rights managers module 2. For example, the indication of encryption can specify that encryption be greater than a specified percentage or in a range of specified percentages.

In step 1506, distributor server 220 monitors various conditions related to data transfer, such as the files size of document 222, network latency, communication speed, and the like in a known manner. In step 1508, distributor server 220 encrypts portions of document 222 based on the conditions monitored in step 1506 and the encryption amount determined in step 1504. Steps 1506 and 1508 are conducted continuously or iteratively until all of document 222 has been transferred. In step 1510, security module 237 decrypts the content and delivers it to the rendering application, i.e. browser 232 in the preferred embodiment.

A variable portion (percentage) of a data stream can be encrypted. Content data can be divided by time intervals or based on the byte size. For example, 10 bytes encrypted, and 90 bytes not-encrypted. The percentage of encryption can be adaptive. That is, depending on the data file size and other conditions, at different times, the percentage of encryption can vary between values specified to speed up the process.

Figure 16:
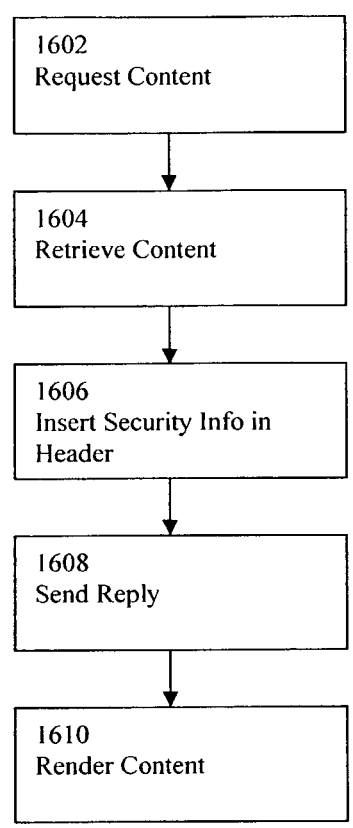
FIG. 16 is a flowchart of a method of operation of the preferred embodiment for embedding security information in a document.

It is known to embed signatures and other security information in the body of an HTTP document. However, such a practice requires special security tags and is difficult to manage since the security information must be parsed out of the document. However, the method of operation of the preferred embodiment illustrated in FIG. 16 simplifies this operation by using only the header of an HTML document for conveying security information.

In step 1602, browser 232 that is regulated by security module 237 requests document 222 from distributor server 220 and security module 237 opens up a standard HTTP or HTTPS connection to distributor server 220. In step 1604, distributor server 220, functioning as a standard HTTP server, retrieves or builds document 222 for downloading. In particular, digital rights management module 224 or another security module component of distributor server 220 authenticates the requesting client by analyzing security information embedded in the headers of the HTTP request and builds a standard HTTP reply.

In step 1606, distributor server 220 inserts security information into the headers of the HTTP reply. For example, the security information, such as a signature can be an attribute of the <Header> tag in an HTML document as set forth below:

<Header>signature=13490680486724869 MY BOOK
       <Header/>

In the example above, the title of the HTML page is "MY BOOK" which will be rendered in accordance with standard HTML rules. The signature is a number as an attribute of the header and will not be rendered but can be culled for security purposes. In step 1608, the reply is sent to security module 237 of client computer 230. In step 1610, security module 237 analyzes the security information in the reply header and passes content of document 222 to browser 232 for rendering in accordance with the usage rights described by or associated with the security information.

Since all of the security information is contained in the header, the resulting DRM system is less intrusive and easier to manage. Also, a new security tag schema or other specification is not necessary. The security component need only know to look in the header to get security information.

Figure 17:
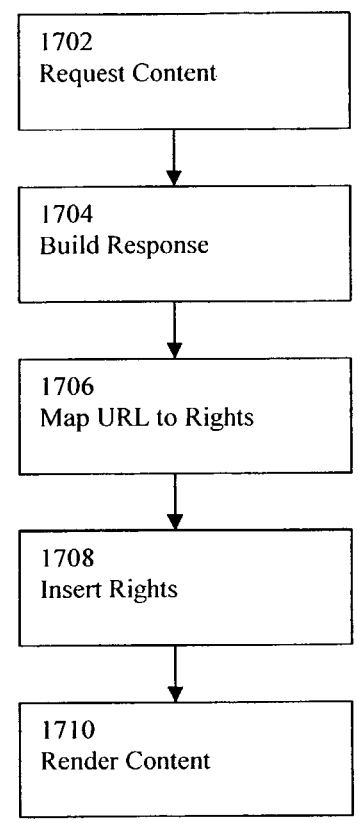
FIG. 17 is a flowchart of a method of operation of the preferred embodiment for determining usage rights based on a requesting URL.

Often content and usage rights are dynamic. For example, the content may change over time and the usage rights may change over time and may be dependent on where the request for content comes from. For example, a company may want to let an employee print or save a document if the document is requested from an on-site, or otherwise secure, computer. However, the same employee requesting the same document from home may only be permitted to view the document. FIG. 17 illustrates a method of use of the preferred embodiment that provides both address and URL filtering to address these issues.

In step 1702, client computer 230 having security module 237, requests secure document 222. In step 1704, distributor server 220 gathers information from either static or dynamic sources of content 222 and builds the response in a known manner. After the response has been built, a server side component of security module 237 accesses a database 225 that maps regular expressions of URL's to usage rights in step 1706. Server side component of security module 237 inserts the rights associated with the reply based on the URL of the request by selecting the rights corresponding to the URL in database 225 in step 1708. The reply is then sent to client computer 230 for rendering of the requested content 222 in accordance with the inserted usage rights under control of client side component of security module 237.

Since both URL addressing and directory addressing are used, dynamic content and content that is best identified by incoming request URL's can be handled appropriately. Directories are filtered in order to provide a high level of confidence that content stored on the distributor server 220 as a file cannot be delivered to an unauthorized user no matter what URL is used to reach the file stored on the server. By using both types of filters, the content owner has flexibility in determining what content should be protected and to what degree. Further, putting security content in the header of an HTML document permits dynamic content to be handled easily because the body of the content does not need to be modified for security and thus permits dynamic content to be used to build a document on the fly.

Another problem often encountered in rendering content, particularly when distributing content over the Internet or other networks, is that the user may not always have the proper rendering application. For example, when downloading a PDF file, content providers will often warn the user that Adobe Acrobat Reader™ is required and may even provide a link to download the software. If the user does not download the software, they cannot render the content. However, downloading the software requires significant action on the part of the viewer, such as clicking on the link, choosing a directory for download, executing the installation software, and the like. In many cases, the user will choose not to download the content to avoid the cumbersome process of installing the proper rendering application. In DRM systems, the need for multiple rendering applications raises security issues if the security component is not attached to a newly installed rendering application.

Figure 18:
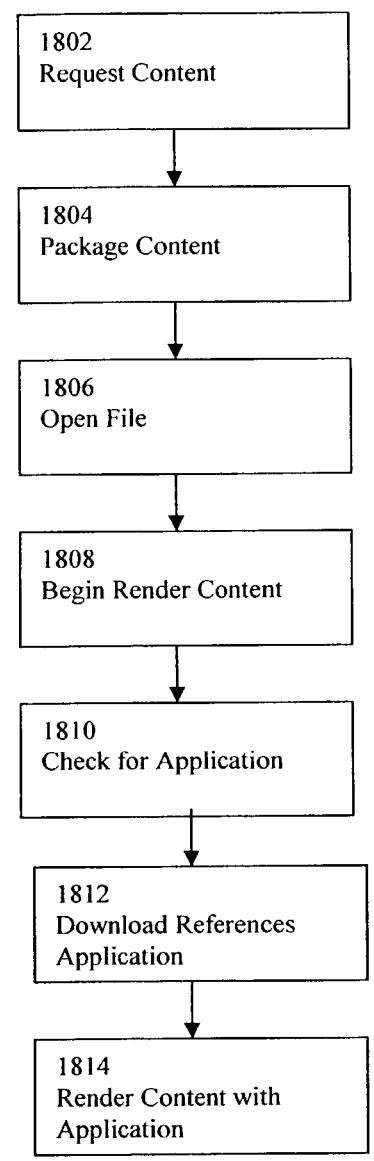
FIG. 18 is a flowchart of a method of operation of the preferred embodiment for downloading necessary rendering applications.

FIG. 18 illustrates a manner of use for providing the proper rendering applications in a manner that is transparent to the user. In step 1802, client computer 230 requests document 222 that is of a file format that cannot be rendered by browser 232. In step 1804, document 222 is packaged as a file of the same format but is "disguised" as an HTML file. For example, the Windows™ operating system identifies file types by file extension. In such a case, the file, for example a PDF file, can be named with an "HTM" extension to be identified as an HTML file by client computer 230.

In step 1806, the file is downloaded to client computer 230 and the user "opens" the file which client computer 230 recognizes as an HTML file. Accordingly, browser 232 is launched as the default HTML viewer. In step 1808, browser 232 begins to render the HTML and finds a reference to an embedded application, like an ActiveX control or Java applet. The browser embedded application causes 232 to check and finds that the referenced application is not installed on client computer 230 in step 1810. The browser follows the reference in the file to download the application in step 1812 and the application is installed on client computer 230 and attached to security module 237 as described above. The application, now used as the rendering application is directed by security module 237 to retrieve the content from within the HTML file and render the content in step 1814.

The drawback of distributing a new file type extension is that if the user receives one of your data files and there is no registered application to handle the request, then the user cannot continue working with the content or must manually install a new application. However, if the new file type is packaged inside an HTML file the Web browser then loads the HTML file and automatically finds the code (JavaScripts, etc.). If the code sees a registered application on the client platform it passes the contained data to that client application. If it does not find an application to handle the data type, it calls upon the browser to navigate to a site that downloads the appropriate rendering application.

Figure 19:
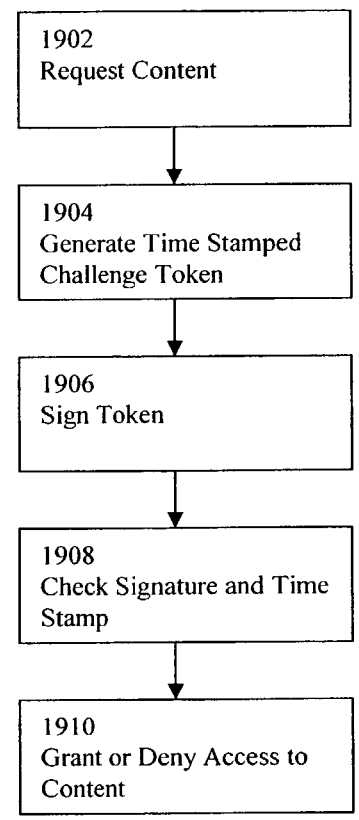
FIG. 19 is a flowchart of a method of operation of the preferred embodiment for time stamping validation tokens.

Another security issue when distributing content over a network, such as the Internet, is the possibility that hackers will intercept messages and "crack" encryption routines to obtain access to protected content. However, circumventing encryption often requires a relatively great deal of time (several seconds for example) because of the need to execute complex software algorithms or generate random numbers. FIG. 19 illustrates a method of operation of the preferred embodiment in which the risk of encryption circumvention is reduced by creating tokens that expire after short period so time.

In step 1902, client computer requests secure content 222. Assuming that a server side security component of security module 237 has not authenticated client computer 230, distributor server 120 generates a challenge token, that is time stamped, in step 1904. Client computer 230 receives the token and uses its non-unique public key private key pair to add a request and sign it in a known manner in step 1906 and returns the signed token to distributor server 220. Upon receipt of the signed token, distributor server 220 verifies the signature of client computer 230 and checks to see when the token was generated by examining the time stamp in step 1908. If the token was generated more than a predetermined time period, 0.5 seconds for example, before being received in a signed fashion, the token is no longer valid and access to content 222 will be denied, in step 1910, even if the signature is otherwise correct.

The time stamp can indicate how long the signature is valid (usually a very short time that permits proper signature but does not permit encryption circumvention) or the time that the signature was created. If an unauthorized party intercepts the message, and tries to imitate the message at a later time, then the signature will have expired and will not be valid.

The invention can be implemented over any type of communications Network, such as the Internet, a local area network (LAN), a wide area network (WAN), direct computer connections, or the like, using any type of communication hardware and protocols. Any type of hardware or combination of hardware can be used for the various clients and servers. Accordingly, the terms "client" and "server" as used herein, can refer to any type of computing device or data terminal, such as a personal computer, a portable computer, a dumb terminal, a thin client, a hand held device, a wireless phone, or any combination of such devices. The various clients and servers can be a single computer at a single location or multiple computers at a single or multiple locations. For example a server may be comprised of a plurality of redundant computers disposed in co-location facilities at various locations to facilitate scalability. There can be any number of clients and any number of servers. The client can physically be located on the same hardware as the server.

Any appropriate server or client software can be used and any communication protocols can be used. Communication can be accomplished over electric cable, fiber optic cable, or any other cable, or in a wireless manner using radio frequency, infrared, or other technologies. The various information can be stored in any format and thus the term "database" as used herein refers to any collection of information such as a database file, a lookup table, or the like. The documents can be of any type and can contain any type of content, such as text, audio information, video information, or combinations of plural types of content. The portions of the invention described above that are described as software components could be implemented as hardware. Moreover, while certain functional blocks are described herein as separate and independent from each other, these functional blocks can be consolidated and performed on a single general-purpose computer, or further broken down into sub-functions as recognized in the art. The set of rights can be one or more rights or rules governing use of the document, can be in any appropriate form, and can be based on various parameters such as the document type, the user's identity, a payment by the user, and the like. The various software modules can be located on the client or the server. For example, the security module can include one or plural components on the server side and/or on the client side as appropriate to accomplish the various functions disclosed above.

While a preferred embodiment of the invention has been described in detail above, it should be recognized that other forms, alternatives, modifications, versions and variations of the invention are equally operative and would be apparent to those skilled in the art. The disclosure is not intended to limit the invention to any particular embodiment, and is intended to embrace all such forms, alternatives, modifications, versions and variations. Accordingly, the true scope of the invention is defined by the appended claims and legal equivalents.

What is claimed:

1. A computer-implemented method executed by one or more computing devices for protecting dynamic content in a system for managing use of the content in accordance with usage rights associated with the content, the method comprising:

receiving, by at least one of the one or more computing devices, a request from a user device associated with a content consumer for access to content that dynamically changes, wherein the content is stored on a server;

determining, by at least one of the one or more computing devices, where the request for access to the content comes from;

gathering, by at least one of the one or more computing devices, information from at least one source to build the content in accordance with the request;

mapping, by at least one of the one or more computing devices, the content to one or more usage rights, wherein at least one of the one or more usage rights is selected based at least in part on the characteristics of the request and the determination of where the request for access to the content came from;

sending, by at least one of the one or more computing devices, a reply including at least one of the one or more usage rights to the user device associated with the content consumer; and permitting, by at least one of the one or more computing devices, use of the content based on at least one of the one or more usage rights under control of a security module for enforcing usage rights.

2. The method of claim 1, wherein the permitting step comprises sending the content to the user device associated with the content consumer and rendering the content with a rendering engine of the user device associated with the content consumer under control of a user device component of the security module.

3. The method of claim 1, further comprising establishing a subdirectory that corresponds to a location of the content on the server.

4. The method of claim 1, further comprising determining a Web page comprising a pointer to a location of the content on the server and wherein the sending step comprises returning the Web page.

5. The method of claim 1, wherein the at least one source comprises static and dynamic sources of content.

6. The method of claim 1, wherein the mapping step is accomplished using at least one of a Web page, uniform resource locator, and an internet protocol address of the user device associated with the content consumer.

7. The method of claim 1, wherein the mapping step comprises dynamically determining at least one of the one or more usage rights upon receipt of the request.

8. The method of claim 2, wherein the security module decrypts and enforces at least one of the one or more usage rights.

9. The method of claim 2, wherein if the security module is not present, rendering of the content is prohibited.

10. An apparatus for protecting dynamic content in a system for managing use of the content in accordance with usage rights associated with the content, the apparatus comprising:
one or more processors; and
one or more memories operatively coupled to at least one of the one or more processors and having instructions stored thereon that, when executed by at least one of the one or more processors, cause at least one of the one or more processors to:
receive a request from a user device associated with a content consumer for access to content that dynamically changes, wherein the content is stored on a server;
gather information from at least one source to build the content in accordance with the request;
determine where the request for access to the content comes from;
map the content to one or more usage rights, wherein at least one of the one or more usage rights is selected based at least in part on the characteristics of the request and the determination of where the request for access to the content came from;
send a reply including at least one of the one or more usage rights to the user device associated with the content consumer; and
permit use of the content based on at least one of the one or more usage rights under control of a security module for enforcing usage rights.

11. The apparatus of claim 10, wherein the instructions that cause at least one of the one or more processors to permit use of the content further cause at least one of the one or more processors to send the content to the user device associated with the content consumer and render the content with a rendering engine of the user device associated with the content consumer under control of a user device component of the security module.

12. The apparatus of claim 10, wherein at least one of the one or more memories has instructions stored thereon that, when executed by at least one of the one or more processors, cause at least one of the one or more processors to establish a subdirectory that corresponds to a location of the content on the server.

13. The apparatus of claim 10, wherein at least one of the one or more memories has instructions stored thereon that, when executed by at least one of the one or more processors, cause at least one of the one or more processors to determine a Web page comprising a pointer to a location of the content on the server and return the Web page.

14. The apparatus of claim 10, wherein the at least one source comprises static and dynamic sources of content.

15. The apparatus of claim 10, wherein the instructions that cause at least one of the one or more processors to map the content further cause at least one of the one or more processors to use at least one of a Web page, uniform resource locator, and an internet protocol address of the user device associated with the content consumer.

16. The apparatus of claim 10, wherein the instructions that cause at least one of the one or more processors to map the content further cause at least one of the one or more processors to dynamically determine at least one of the one or more usage rights upon receipt of the request.

17. The apparatus of claim 11, wherein the security module decrypts and enforces the usage rights.

18. The apparatus of claim 11, wherein if the security module is not present, rendering of the content is prohibited.

19. A computer-implemented method executed by one or more computing devices for protecting dynamic content in a system for managing use of the content in accordance with usage rights associated with the content, the method comprising:
storing, by at least one of the one or more computing devices, content on a server;
identifying, by at least one of the one or more computing devices, one or more requests for access to the content;
mapping, by at least one of the one or more computing devices, one or more usage rights to at least one of the identified requests;
modifying, by at least one of the one or more computing devices, the content on the server;
receiving, by at least one of the one or more computing devices, a request from a user device associated with a content consumer for access to the modified content;
determining, by at least one of the one or more computing devices, where the request for access to the content comes from;
gathering, by at least one of the one or more computing devices, information from at least one source to build a response content in accordance with the request;
mapping, by at least one of the one or more computing devices, the response content to at least one of the one or more usage rights, wherein the at least one of the one or more usage rights is selected based at least in part on the characteristics of the request, the determination of where the request for access to the content came from, and on the mapping of the one or more usage rights to the at least one identified request;

sending, by at least one of the one or more computing devices, a reply including at least one of the one or more usage rights to the user device associated with the content consumer; and permitting, by at least one of the one or more computing devices, use of the content based on at least one of the one or more usage rights under control of a security module for enforcing usage rights.

20. The method of claim 19, wherein the permitting step comprises sending the content to the user device associated with the content consumer and rendering the content with a rendering engine of the user device associated with the content consumer under control of a user device component of the security module.

21. The method of claim 19, further comprising establishing a subdirectory that corresponds to a location of the content on the server.

22. The method of claim 19, further comprising determining a Web page comprising a pointer to a location of the content on the server and wherein the sending step comprises returning the Web page.

23. The method of claim 19, wherein the at least one source comprises static and dynamic sources of content.

24. The method of claim 19, wherein the step of mapping the response content is accomplished using at least one of a Web page, uniform resource locator, and an internet protocol address of the user device associated with the content consumer.

25. The method of claim 19, wherein the step of mapping the response content comprises dynamically determining at least one of the one or more usage rights upon receipt of the request.

26. The method of claim 20, wherein the security module decrypts and enforces at least one of the one or more usage rights.

27. The method of claim 20, wherein if the security module is not present, rendering of the content is prohibited.

28. At least one non-transitory computer-readable medium storing computer-readable instructions that, when executed by one or more computing devices, cause at least one of the one or more computing devices to:

receive a request from a user device associated with a content consumer for access to content that dynamically changes, wherein the content is stored on a server;

gather information from at least one source to build the content in accordance with the request;

determine where the request for access to the content comes from;

map the content to one or more usage rights, wherein at least one of the one or more usage rights is selected based at least in part on the characteristics of the request and the determination of where the request for access to the content came from;

send a reply including at least one of the one or more usage rights to the user device associated with a content consumer; and permit use of the content based on at least one of the one or more usage rights under control of a security module for enforcing usage rights.

29. The at least one non-transitory computer-readable medium of claim 28, wherein the instructions that cause at least one of the one or more computing device to permit use of the content further cause at least one of the one or more computing devices to send the content to the user device associated with the content consumer and render the content with a rendering engine of the user device associated with the content consumer under control of a user device component of the security module.

30. The at least one non-transitory computer-readable medium of claim 28, further storing computer-readable instructions that, when executed by one or more computing devices, cause at least one of the one or more computing devices to establish a subdirectory that corresponds to a location of the content on the server.

31. The at least one non-transitory computer-readable medium of claim 28, further storing computer-readable instructions that, when executed by one or more computing devices, cause at least one of the one or more computing devices to determine a Web page comprising a pointer to a location of the content on the server and return the Web page.

32. The at least one non-transitory computer-readable medium of claim 28, wherein the at least one source comprises static and dynamic sources of content.

33. The at least one non-transitory computer-readable medium of claim 28, wherein the instructions that cause at least one of the one or more computing devices to map the content further cause at least one of the one or more computing device to use at least one of a Web page, uniform resource locator, and an internet protocol address of the user device associated with the content consumer.

34. The at least one non-transitory computer-readable medium of claim 28, wherein the instructions that cause at least one of the one or more computing devices to map the content further cause at least one of the one or more computing devices to dynamically determine at least one of the one or more usage rights upon receipt of the request.

35. The at least one non-transitory computer-readable medium of claim 29, wherein the security module decrypts and enforces at least one of the one or more usage rights.

36. The at least one non-transitory computer-readable medium of claim 29, wherein if the security module is not present, rendering of the content is prohibited.

* * * * *